(12) United States Patent  
Nakamura

(10) Patent No.: US 7,565,508 B2  
(45) Date of Patent: Jul. 21, 2009

(54) ALLOCATING CLUSTERS TO STORAGE PARTITIONS IN A STORAGE SYSTEM

(75) Inventor: Shuji Nakamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 11/139,186

(22) Filed: May 27, 2005

(65) Prior Publication Data

US 2006/0224854 A1 Oct. 5, 2006

(30) Foreign Application Priority Data

Apr. 4, 2005 (JP) ............................ 2005-107012

(51) Int. Cl.  
*G06F 12/00* (2006.01)  
*G06F 13/00* (2006.01)  
(52) U.S. Cl. ...................................... 711/173  
(58) Field of Classification Search ................. 711/173  
See application file for complete search history.

(56) References Cited

U.S. PATENT DOCUMENTS 5,129,088 A * 7/1992 Auslander et al. ............. 711/1  
6,647,461 B2 11/2003 Fujimoto et al.  
2001/0044883 A1* 11/2001 Abe et al. .................... 711/150  
2007/0038824 A1* 2/2007 Suishu et al. ................ 711/162

OTHER PUBLICATIONS

"IBM TotalStorage DS8000 Series," IBM Corporation, Document ID TSD00374-USEN-00 (2004), 6 pages.  
"Storage System LPARs (Logical Partitions)," IBM Corporation, *DS8000 Series: Concepts and Architecture*, Draft Document (Jan. 25, 2005), pp. 43-60.

* cited by examiner

*Primary Examiner*—Hyung S Sough  
*Assistant Examiner*—Mardochee Chery  
(74) *Attorney, Agent, or Firm*—Townsend and Townsend and Crew LLP

(57) ABSTRACT

The bandwidth of the inter-connection network between the clusters is quite narrower than that of the inter-connection network in the clusters. When the logical allocation technique is simply applied to a cluster storage system, there is created a logical partition associated with two or more clusters. It is not possible to create logical partitions of performance corresponding to resources allocated thereto. In a storage system including a first cluster and a second cluster, when a resource of the storage system is logically subdivided into logical partitions, a resource of the first cluster is allocated to one logical partition. The system may be configured such that the first and second clusters are connected via switches to disk drives. The system may also be configured such that when failure occurs in the first cluster, the second cluster continuously executes processing of the first cluster.

9 Claims, 18 Drawing Sheets

FIG.3

| RESOURCE NAME | LOGICAL PARTITION NO. | | |
|---|---|---|---|
| | 1 | 2 | 3 |
| CHANNEL CONTROLLER | | | |
| CHANNEL | 15% | 35% | 35% |
| PROCESSOR POWER | 15% | 35% | 35% |
| INTERNAL PATH | 15% | 35% | 35% |
| CACHE MEMORY | | | |
| CAPACITY | 25% | 40% | 25% |
| DISK CONTROLLER | | | |
| PROCESSOR POWER | 10% | 40% | 40% |
| INTERNAL PATH | 10% | 40% | 40% |
| H D D | | | |
| CAPACITY | 17% | 33% | 33% |

FIG.7
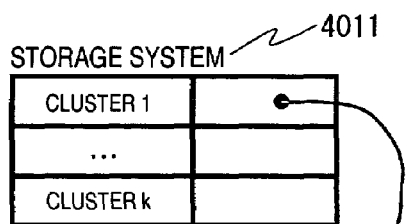
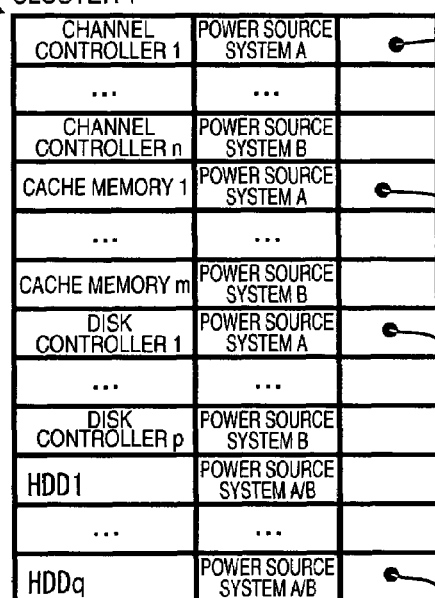

FIG.9

CLUSTER 1

| RESOURCE NAME | | | LOGICAL PARTITION NO. | | |
|---|---|---|---|---|---|
| | | | 1 | 2 | 3 |
| CHANNEL CONTROLLER 1 | CHANNEL | CHANNEL 1 | 100% | 0% | 0% |
| | | ... | ... | ... | ... |
| | | CHANNEL r | 0% | 0% | 100% |
| | PROCESSOR | PROCESSOR 1 | 50% | 0% | 50% |
| | | ... | ... | ... | ... |
| | | PROCESSOR s | 50% | 0% | 50% |
| | INTERNAL PATH | INTERNAL PATH 1 | 50% | 0% | 50% |
| | | ... | ... | ... | ... |
| | | INTERNAL PATH t | 50% | 0% | 50% |
| ... | ... | ... | ... | ... | ... |
| CHANNEL CONTROLLER n | ... | ... | ... | ... | ... |
| CACHE MEMORY 1 | CAPACITY | MEMORY 1 | 50% | 0% | 50% |
| | | ... | ... | ... | ... |
| | | MEMORY u | 50% | 0% | 50% |
| ... | ... | ... | ... | ... | ... |
| CACHE MEMORY m | ... | ... | ... | ... | ... |
| DISK CONTROLLER 1 | PROCESSOR | PROCESSOR 1 | 50% | 0% | 50% |
| | | ... | ... | ... | ... |
| | | PROCESSOR s | 50% | 0% | 50% |
| | INTERNAL PATH | INTERNAL PATH 1 | 50% | 0% | 50% |
| | | ... | ... | ... | ... |
| | | INTERNAL PATH t | 50% | 0% | 50% |
| ... | ... | ... | ... | ... | ... |
| DISK CONTROLLER p | ... | ... | ... | ... | ... |
| HDD | | HDD1 | 100% | 0% | 0% |
| | | ... | ... | ... | ... |
| | | HDDq | 0% | 0% | 100% |

101 102 103

| FAILED MODULE | TRANSFER CONDITION |
|---|---|
| POWER SOURCE | ONE-MODULE FAILURE |
| CHANNEL CONTROLLER | UNCHANGED |
| CACHE MEMORY | ONE-MODULE FAILURE |
| DISK CONTROLLER | TWO-MODULE FAILURE |
| INTERNAL PATH | REDUCTION OF 50% OF TOTAL BANDWIDTH |

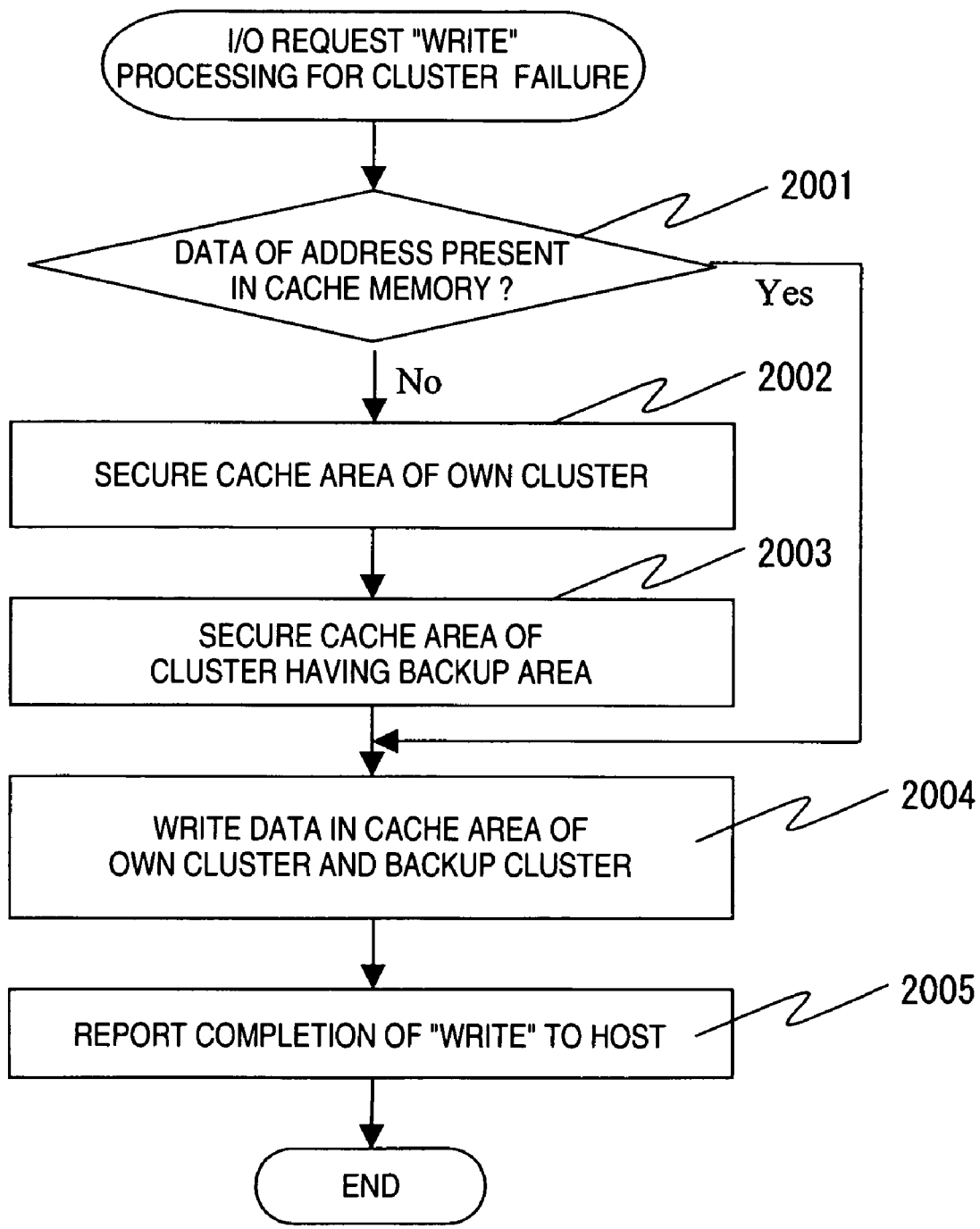

ALLOCATING CLUSTERS TO STORAGE PARTITIONS IN A STORAGE SYSTEM

INCORPORATION BY REFERENCE

The present application claims priority from Japanese application JP 2005-107012 filed on Apr. 4, 2005, the content of which is hereby incorporated by reference into this application.

BACKGROUND OF THE INVENTION

The present invention relates to a storage system, and in particular, to a logical partition method of the same.

In the information business sites such as a data center, it has been desired to reduce the total cost of ownership (TCO) of a storage system. For this purpose, a plurality of existing storage systems are replaced with a comprehensive, large-sized, single storage system to thereby achieve storage consolidation. In this description, a storage system indicates a system including a hard disk drive (to be referred to as an HDD hereinbelow) and a storage controller to control hard disk drives.

A storage logical partition technique is known as a technique to implement the storage consolidation. According to the technique, one storage system is subdivided into a plurality of Logical Partitions (LPAR) such that a plurality of individual storage systems seem to exist for users. As a result, the administrator of a storage system can concentrate on management of one physical storage system. This reduces the management cost as well as the physical area of the floor in which the system is installed, and resultantly lowers the total cost of ownership of the storage system.

There has been known a technique to provide a storage system having flexibility and scalability for a wide range of systems in configurations ranging from a small-sized configuration to a large-sized configuration using the same architecture of the high performance and the high reliability (reference is to be made to U.S. Pat. No. 6,647,461 and JP-A-2001-256003 corresponding thereto). According to the technique, a plurality of relatively small-sized storage systems (to be referred to as clusters hereinbelow) are connected to each other by an inter connection network to be operated as one system. A system including a plurality of clusters is called a storage system of cluster type or a cluster storage system.

SUMMARY OF THE INVENTION

In association with the technical tendency described above, it can be considered to apply the logical partition technique to the cluster storage system in future. However, when the technique is simply applied to the storage system, problems occur as below.

In the cluster storage system, the bandwidth of the inter-connection network between the clusters is quite narrower than that of the inter-connection network in the clusters. To fully guarantee performance for an access between the clusters, it is required to considerably increase the bandwidth of the inter-connection network between the clusters. This soars the production cost of the storage system. On the other hand, it is desired to reduce the cost of the cluster storage system for the following reason. When an expensive cluster storage system is used, there exists a fear of cancellation of the cost merit of the storage consolidation. Consequently, the cluster storage system cannot have a sufficient bandwidth for the inter-connection network between the clusters which soars the production cost.

When the logical partition technique is applied to the cluster storage system with a bandwidth restriction described above, it is desirable to guarantee performance corresponding to resources allocated to each logical partition. Referring to FIGS. 2 and 3, an example thereof will be described in conjunction with a cluster storage system including two clusters. In FIGS. 2 and 3, a plurality of clusters 10 are discriminated using a numeral with a hyphen, e.g., 10-1.

Assume that the system is divided into three logical partitions as indicated by a logical partition resource allocation table shown in FIG. 3. Assume in this situation that the resources in the cluster storage system are sequentially allocated in an ascending order of logical partition numbers assigned to the logical partitions. FIG. 2 shows a state of resource allocation in this case. Paying attention to a capacity 704 of a cache memory of FIG. 3, 25% of the overall capacity of the cache memory in the system is allocated to a logical partition 1 (101). Since two clusters 10-1 and 10-2 are arranged, 50% of the cache memory 13 of the cluster 10-1 is allocated to the logical partition 1 (101). The capacity allocation 704 of the cache memory 13 of the logical partition 2 (102) is 40% in the overall storage system, i.e., 80% of the cache memory 13 of the cluster 10-1. However, since 50% of the cache memory 13 of the cluster 10-1 is beforehand allocated to the logical partition 1 (101), the remaining 50% thereof is first allocated to the logical partition 2 (102). The further remaining 30% is allocated to the cache memory 13 of the cluster 10-2. That is, the cache memories 13 allocated to the logical partition 2 (102) are associated with two clusters 10, i.e., 10-1 and 10-2, or the memory allocation reserves areas of two clusters 10. In this case, it is predicted in the logical partition 2 (102) that an access to the cache memories 13 frequently occurs via the inter-connection network (inter-cluster path 20 in FIG. 2) of an insufficient bandwidth. Therefore, the logical partition 2 (102) cannot guarantee performance corresponding to resources allocated thereto and becomes a logical partition with relatively low performance. The number of combinations to cause the problem increases as the number of allocatable resources increases.

As can be seen from the description above, when the logical partitioning technique is simply applied to the cluster storage system, it is desired to guarantee logical partitions each of which has performance corresponding to resources allocated thereto.

In order to solve the above problem, it is therefore an object of the present invention to provide a cluster storage system in which resources are allocated to each logical partition, the resources belonging to a particular cluster associated with the logical partition.

BRIEF DESCRIPTION OF THE DRAWINGS

FIG. 3 is a diagram showing a logical partition resource allocation table;

FIG. 7 is a diagram showing a physical resource allocation table;

FIG. 9 is a diagram showing part of the physical resource allocation table;

FIG. 20 is a flowchart showing operation when an input/output request of "write" is received from a host at occurrence of failure.

DESCRIPTION OF THE EMBODIMENTS

Figure 1:
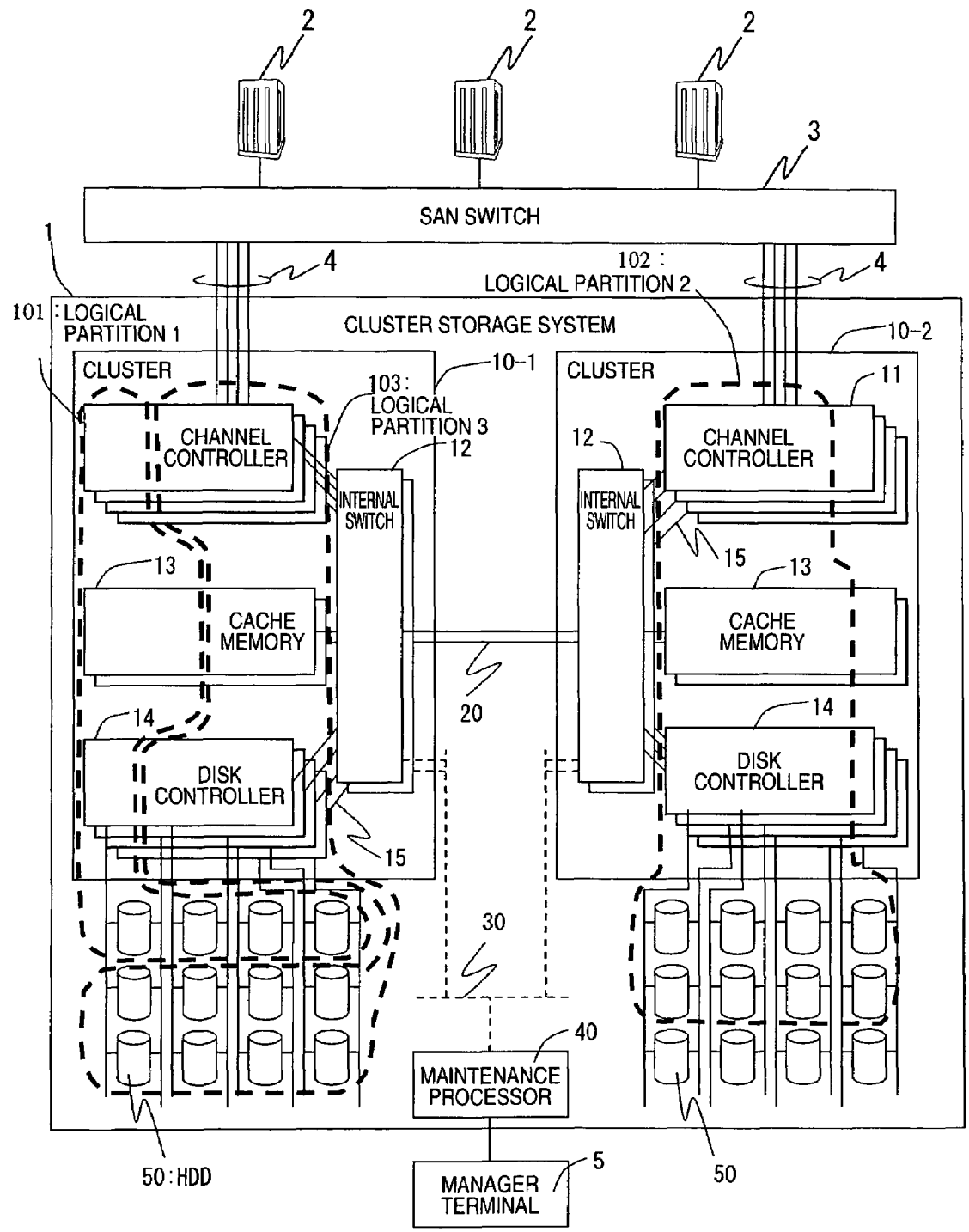
FIG. 1 is a diagram showing logical partitions allocated in accordance with the present invention.

Referring now to the drawings, description will be given of an embodiment of the present invention.

First Embodiment

Figure 4:
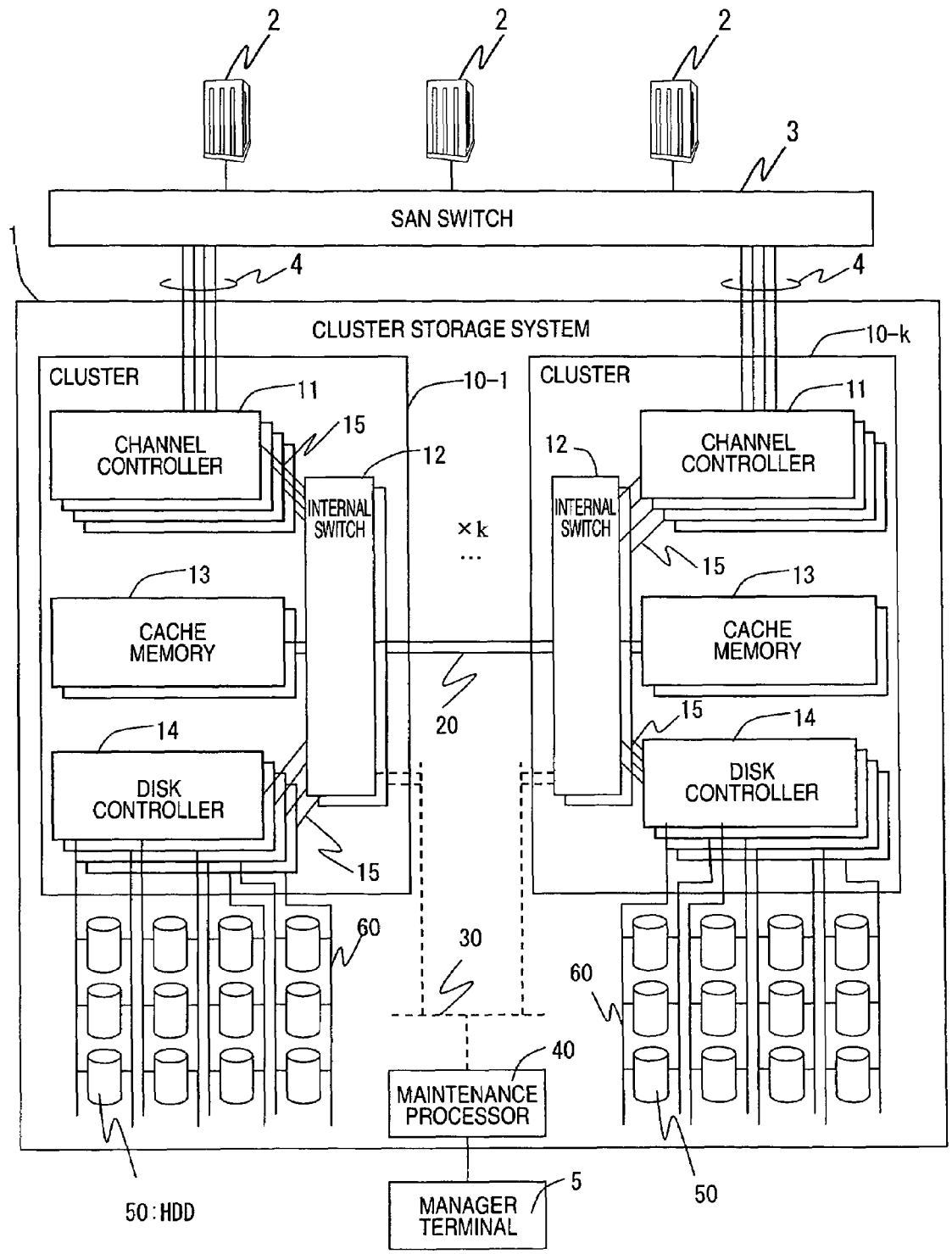
FIG. 4 is a configuration diagram of a first embodiment of a computer system.

FIG. 4 shows a configuration of a first embodiment of a computer system. The system includes a plurality of host computers (to be referred to as hosts hereinbelow) 2, a Storage Area Network (SAN) switch 3, a cluster storage system 1, and a administrator terminal 5. The storage system 1 is connected via a channel 4 and an SAN including the SAN switch 3 to the host 2 and is connected via a Local Area Network (LAN) and/or an SAN to the terminal 5.

The storage system 1 includes a plurality of clusters 10 (10-1 to 10-$k$), an inter-cluster path 20, a management network 30, a plurality of Hard Disk Drives (HDD) 50, a disk-side channel 60, and a maintenance processor 40. The clusters 10 are mutually connected to each other via the path 20 and are connected via the network 30 to the processor 40 and the terminal 5.

In the description below, resources indicate physical and logical resources of the cluster storage system such as a channel controller, a cache memory, a disk controller, an internal switch, a processor, an internal path, and an HDD. In the first embodiment, a cluster indicates a unit serving as a storage system and includes constituent components such as a channel controller, a cache memory, disk controller, an internal switch, and an HDD.

The cluster 10 includes a channel controller 11, a cache memory 13, a disk controller 14, and an internal switch 12 to connect these components via an internal path 15 to each other. The cluster 10 may include two or more units of respective resources.

The channel controller 11 receives an input-output (I/O) request via the channel 4 from the host 2 and interprets a request type of the request, e.g., a read/write request and a target address. The channel controller 11 accesses directory information 1323 stored in a control data area 132 of the cache memory 13 shown in FIG. 6 and makes a search for an address of the cache memory 13 to read therefrom or to write therein data requested by the host 2.

When the data which is requested by host 2 is absent from the cache memory 13 or the data to be stored in the HDD 50 is existing therein, the disk controller 14 controls the HDD 50 via the channel 60. To increase availability and performance of the overall HDD 50 in this situation, the disk controller 14 conducts Redundancy Arrays of Independent Disks (RAID) control for the group of HDDs 50. Although the HDD 50 is a magnetic disk drive in general, there may also be used a disk drive of another recording medium such as an optical disk.

In FIG. 1, the inter-cluster path 20 is connected to the internal switch 12 of each cluster 10 in the embodiment. However, the path 20 may be connected using a channel controller 11 of the cluster 10. In general, the total bandwidth of the path 20 is less than that of the internal path 15.

The maintenance processor 40 is connected via the management network 30 to each cluster 10. Although not shown in FIG. 4, the management network 30 is connected via the internal switch 12 to the respective components such as the channel controller 11 also in the cluster 10. The maintenance processor 40 sets various setting information items of each cluster 10 and indicates an operation mode, for example, to close a resource. The maintenance processor 40 also collects information about each resource, for example, information indicating that an excessive load is imposed on the resource and information about a state of the resource indicating, for example, an event of failure of the resource. Additionally, the maintenance processor 40 communicates with the administrator terminal 5 the collected information items and the setting information set to the respective resources as above.

In the description of each embodiment, although a processor is disposed in the constituent modules such as the channel controller and the disk controller, the processor may be independently disposed as a unit separated from the associated module.

The administrator terminal 5 is employed for the administrator of the cluster storage system 1 to manage the system 1. In operation, the administrator terminal 5 processes the information collected by the maintenance processor 40, produces information items which help the administrator to set the system 1 and to recognize a state thereof, and passes the information items to the administrator. The administrator terminal 5 also processes a setting indication from the administrator to produce information items, which are to be appropriately transmitted to the system 1. The administrator terminal 5 may be installed in the cluster storage system 1. The processors/processor of the channel controller 11 and/or that of the disk controller 14 may also achieve functions of the maintenance processor 40. Similarly, the maintenance processor 40 may execute the processing of the administrator terminal 5. The administrator terminal 5 may be implemented in the cluster storage system 1. It is also possible for the maintenance processor 40 to perform processing at the administrator terminal 5.

Figure 5:
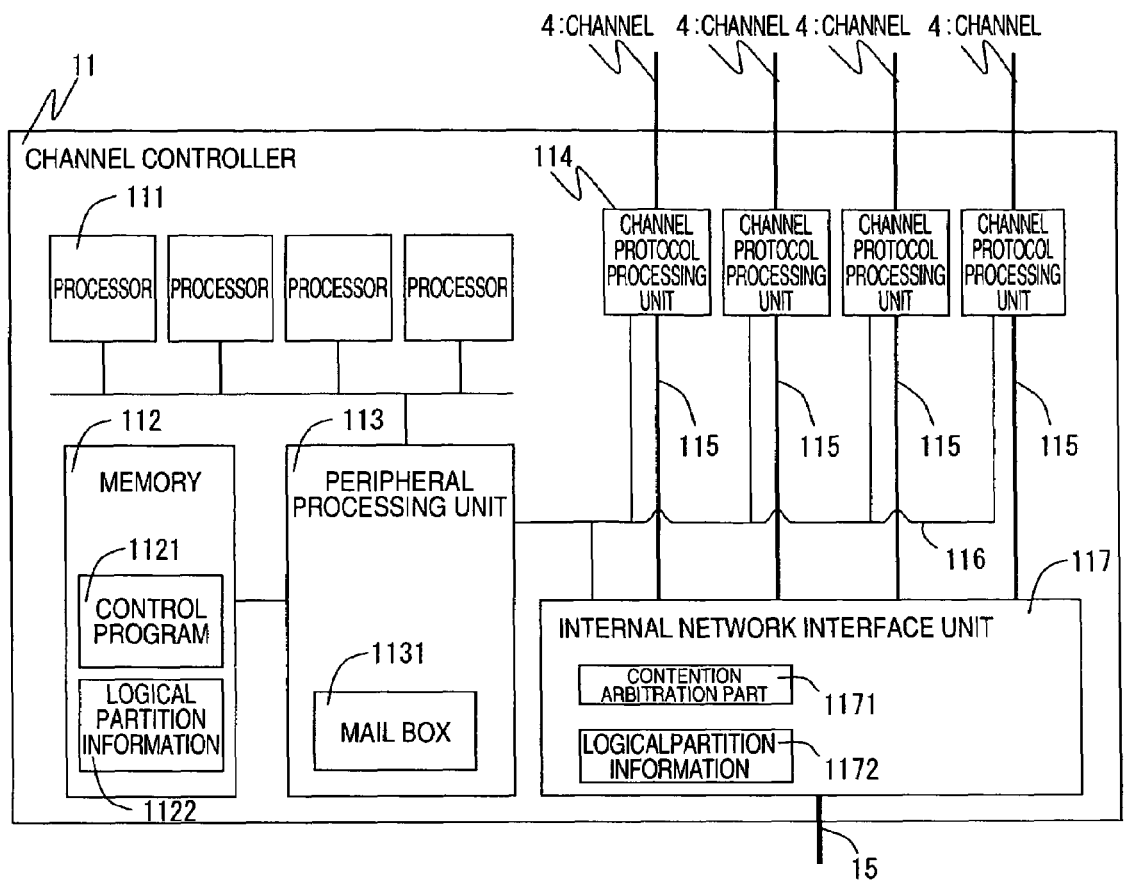
FIG. 5 is a diagram showing an inner configuration of a channel controller 11.

FIG. 5 shows an inner configuration of the channel controller 11. The controller 11 includes processors 111, a memory 112, a peripheral processing unit 113 to control the memory 112, channel protocol processors 114, and an internal network interface unit 117. The processors 111 are connected via, for example, a bus to the peripheral processing unit 113. The peripheral processing unit 113 is connected to the memory 112 and is also connected via a control bus 116 to the channel protocol processors 114 and the internal network interface unit 117.

The processor 111 accesses the memory 112 via the peripheral processing unit 113, and then it produces logical partitions based on the control program 1121 and the logical partition information 1122 (including programs, information on logical partition and correspondence between channels 4 and the logical partitions) regarding the processors 111, the channels 4, and the internal path 15 stored in the memory 112. During the operation, the processor 111 stores data indicated in response to a write request from the host 2 in the cache memory 13, or transfers data indicated in response to a read request of the host 2 from the cache memory 13. In this situation, when the cache memory 13 does not include any area in which the data is stored or when the data is absent from the cache memory 13, the processor 111 instructs the disk controller 14 to write the data of the cache memory 13 in the HDD 50 or to read data from the HDD 50 to store the data in the cache memory 13.

To conduct the logical partitions for the processors, the processor 111 may execute a software program called "hypervisor". Or, a logical partition of each processor 111 may be beforehand described in the logical partition information 1122 so that each processor 111 determines the logical partition to be used by the processor 111. The hypervisor is a software program in a layer below the operation system layer and controls a plurality of operation systems executed by one processor. In the embodiment, the control program 1121 may include the hypervisor.

The peripheral processing unit 113 receives a packet from the processor 111, the channel protocol processing unit 114, and the internal network interface unit 117 connected thereto. If the packet includes a transfer destination address indicating the memory 112, the peripheral processing unit 113 executes processing for the memory 112 and returns data according to necessary. If the transfer destination address is other than the memory 112, the peripheral processing unit 113 transfers the packet to an associated transfer destination. The peripheral processing unit 113 includes a mail box 1131 for the maintenance processor 40 and other processors (in resources other than the pertinent resources) 111 to conduct communication with the processors 111 linked with the peripheral processing unit 113. For example, the mail box 1131 is used when the processor 111 of the channel controller 11 communicates data with the processor 111 of the disk controller 14 or when control is transferred between processing, which will be described later.

The channel protocol processing unit 114 controls protocols on the channel 4 to achieve a protocol conversion to prepare a protocol to be processed in the storage system 1. When an input/output request is received via the channel 4 from the host 2, the channel protocol processing unit 114 notifies to the processor 111 information items contained in the request such as a host number, a Logical Unit Number (LUN), and an access destination address. According to the notification, the processor 111 accesses the directory information 1323 in the cache memory 13, which will be described later in conjunction with FIG. 6. The processor 111 then determines an address to store data indicated by the request or an address in the cache memory 13 at which the data exists, creates a transfer list including information of a logical partition number, and sets the list to the channel protocol processing unit 114. The transfer list is a list including addresses on the cache memory 13.

The channel protocol processing unit 114 communicates data via the data transfer bus 115 with the internal network interface unit 117 to write data from the host 2 at an address described in the list. If the input/output request is a write request, the processing unit 114 writes data from the host 2 via the interface unit 117 at an address described in the list. If the request is a read request, the processing unit 114 reads data beginning at an address described in the list and returns the data to the host 2.

The interface unit 117 serves as an interface when the channel controller 11 communicates data via the internal path 15 with other modules in the storage system 1.

In this specification, a module indicates one of the constituent components of the cluster such as a channel controller, a cache memory, an internal switch, a disk controller, and a power supply. In general, one package (circuit board) corresponds to one module and is used as the unit for replacement and additional installation.

The interface unit 117 stores logical partition information 1172 registered when the system configuration is set. The information 1172 includes information regarding a usage ratio of the internal path 15 of each logical partition in the channel controller 11. A contention arbitration unit 1171 in the interface unit 117 has a function to arbitrate a request from the processor 111 or the channel protocol processing unit 114 to use the internal path 15 and may be implemented using software. In operation, according to the logical partition information 1172, use of each internal path 15 is granted such that the bandwidth of the internal path 15 available for each logical partition conforms to the beforehand designated values. This is realized using, for example, a Weighted Round Robin algorithm.

The disk controller 14 is configured in almost the same way as for the channel controller 11. However, the controllers 14 and 11 differ from each other with respect to the contents of the control program 1121 and communication between the processing unit 114 and the HDD 50. The disk controller 14 executes the control program 1121 to write data from the cache memory 13 onto the HDD 50 in response to a request from the channel controller 11 or at a fixed interval of time. If data requested by the host 2 is absent from the cache memory 13, the disk controller 14 receives an instruction from the channel controller 11 to read data from the HDD 50 to write the data in the cache memory 13. The protocol of the channel 4 may differ from that of the disk-side channel 60. Even then, the disk-side channel 60 executes the process which is similar to the one which the channel protocol processing unit 114 of the channel controller 11 does in the sense that the protocol processing on the disk-side channel 60 is executed so that the processing is executed in the storage system.

Figure 6:
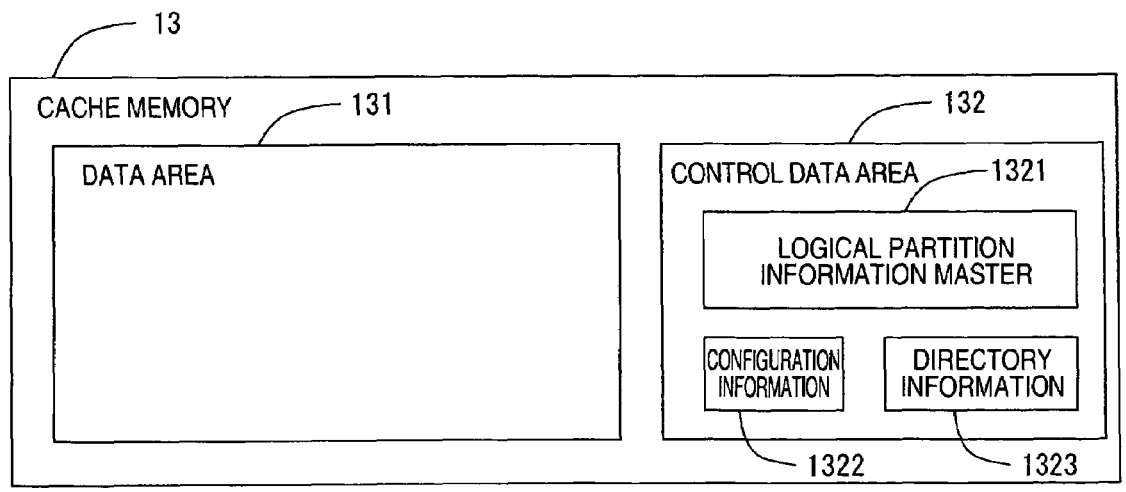
FIG. 6 is a diagram showing an inner configuration of a cache memory 13.

FIG. 6 shows data stored in the cache memory 13. The memory 13 mainly includes a data area 131 and a control data area 132. The area 131 is an area to store data stored in the HDD 50 or to be stored therein. The area 132 is an area to store information to control the storage system 1. The area 132 stores a logical partition information master 1321, layout information 1322, and directory information 1323.

The information master 1321 is a master of information regarding logical partitions existing in each channel controller 11 and each disk controller 14. For example, when a channel controller 11 fails and is replaced with a new channel controller 11, the information regarding logical partitions stored in the failed channel controller 11 is lost and hence the original setting cannot be restored. To cope with such a situation, the original information of the channel controller 11 is desirably stored in a cache memory, which is used to relatively easily increase reliability in implementation of the system. The original information is called "master".

The layout information 1322 is information indicating the total amount of physical resources and the setting of volumes in each logical partition. The directory information 1322 is information indicating data stored in the data area 131.

To the cache memory 13, a usage capacity of the memory to be used can be set for each logical partition. The processor 111 sets the usage capacity at creation of a transfer list. The data area 131 and the control data area 132 may be implemented using physically separated memories. To respectively access these two areas, it is also possible to respectively dispose the internal paths 15 in a physically separated way.

FIG. 7 shows a physical resource allocation table 401. The maintenance processor 40 creates the table 401 by accessing each module of the storage system to collect information necessary for the table 401. The table 401 includes areas and fields hierarchically configured.

A storage system hierarchy 4011 includes information regarding clusters 10 constituting the storage system 1. Specifically, each entry includes a pointer indicating a position at which detailed information items of an associated cluster 10 are stored. The pointer indicates a position at which information in a cluster hierarchy 4012 exists. The number of entries indicates the number of resources. For example, FIG. 7 includes k entries and hence there exist k clusters.

The cluster hierarchy 4012 stores information items of a channel controller 11, a cache memory 13, a disk controller 14, and HDD 50 included in an associated cluster 10. As in the storage system hierarchy 4011, each entry of the cluster hierarchy 4012 stores a pointer indicating a storage of detailed information of each of the constituent components and information indicating which one of power sources drives the associated component, which will be described later in detail in conjunction with FIG. 12. The pointers of the cluster hierarchy 4102 indicate lower hierarchies such as a channel controller hierarchy 4013, a cache memory hierarchy 4014, a disk controller hierarchy 4015, and an HDD hierarchy 4016. The channel controller hierarchy 4013 stores items such as a bandwidth of a channel 4 connected to the channel controller 11, performance of a processor 111 of the channel controller 11, a bandwidth of an internal path 15 connected thereto. The cache memory hierarchy 4014 includes entries each of which includes a capacity and a transfer rate of an associated memory. The disk controller hierarchy 4015 includes items such as a performance of a processor 11 in the disk controller and a bandwidth of an internal path 15 connected thereto. The HDD hierarchy 4016 includes information items such as a capacity and a rotary speed of an associated disk drive.

In the embodiment, since the disk-side channel 60 depends on the performance and the number of the HDDs 50, information thereof need not be described in the physical resource allocation table 401 and is not shown in the drawings, either. However, if the information of the disk-side channel 60 is independent of the performance and the number of the HDDs as in a second embodiment, which will be described later, it is favorable that the information is also stored and allocated like the information items of the other resources.

Figure 8:
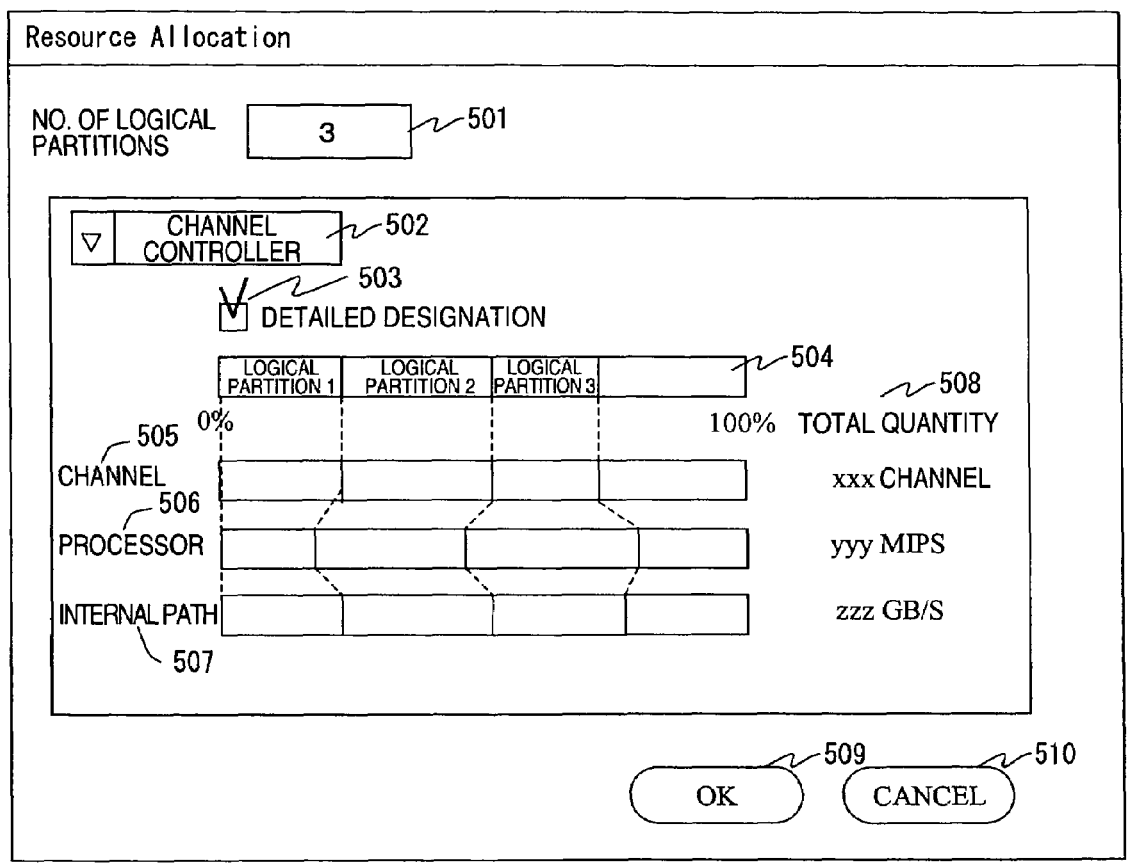
FIG. 8 is a diagram showing an example of a Graphical User Interface (GUI) used when the administrator allocates resources to respective logical partitions.

FIG. 8 shows an example of a Graphical User Interface (GUI) provided by the administrator terminal 5 for the administrator to allocate resources to respective logical partitions. Information items collected for each of the respective resources as shown in FIG. 7 are processed to produce information such as the total quantity of a resource for easy understanding of the resource allocation. FIG. 8 shows such information items using GUI to suggest the administrator that the administrator appropriately sets a suitable layout of logical partitions.

A field of number of logical partitions 501 is a column for the administrator to input the number of logical partitions used in the cluster storage system 1. The number also determines the number of logical partitions which can be set in subsequent steps.

A setting module field 502 is a column for the administrator to select a module for resource allocation. The administrator selects a module from the channel controller 11, the cache memory 13, the disk controller 14, and the HDD 50.

A detailed designation check box 503 is used by the administrator to also designate detailed items of each module.

A total allocation field 504 is a column to input each logical partition allocation when the administrator does not determine the detailed items. That is, values similar to those determined therein also apply to a channel allocation column 505, a processor allocation column 506, and an internal path allocation column 507. The column 504 includes as many fields or frames as indicated by the number of logical partitions field 501. The administrator sets a ratio of the resource to each logical partition by dragging the frame of the field.

It is to be appreciated that 100% indicated by the total allocation column 504 is designated on the basis of not 100% of each cluster 10 but 100% of the resource of the channel controller 11 in the storage system 1. When the administrator desires to designate detailed items for each resource in a module, the administrator checks the box 503 to thereafter set detailed items using the columns 505, 506, and 507 in an input procedure similar to that used to set the total allocation column 504. During this operation, the total quantity column 508 is displaying the total resource quantity of each resource in the storage system 1.

Since FIG. 8 shows a case in which the channel controller 11 is selected by the setting module column 502, the columns 505 to 507 are associated with the channel allocation, the processor allocation 506, and the internal path allocation 507. However, when the cache memory 13 is selected, a memory capacity allocation column is displayed. When the disk controller 14 is selected, a processor allocation column and an internal path allocation column are displayed. When the HDD 50 is selected, a capacity allocation column and a number of HDD for allocation column are displayed.

After completely inputting the setting items, the administrator depresses a submission or OK button 509 to notify the completion of the setting to the administrator terminal 5. The administrator can also depress a cancel button 510 to notify the administrator terminal 5 to restore the original setting.

FIG. 3 shows a logical partition resource allocation table 301. The table 301 includes a ratio of each resource in each logical partition determined by the administrator using the administrator terminal 5 and is stored in the terminal 5. As above, the maintenance processor 40 creates the table of FIG. 7. On the basis of the table, the administrator terminal 5 suggests the administrator that the administrator allocate resources using the GUI shown in FIG. 8. As a result, the table of FIG. 3 is obtained. The administrator terminal 5 delivers the table to the maintenance processor 40.

The allocation table 301 includes columns 101 to 103 for the logical partition numbers and rows 701 to 707 for resource allocation. For example, resources allocated to the channel controller 11 include a number of channels 701, processor power 702, and an internal path bandwidth 703. In the table 301, the total of each resource in the storage system 1 is represented as 100%. For example, in the system 1 including a total cache memory capacity of 100 gigabytes (GB), when the allocation is conducted as indicated by the cache memory capacity 704; 25 GB, 40 GB, and 25 GB are allocated to the logical partitions 1, 2, and 3, respectively. The utilized quantity of the memory is 90 GB, and the rest thereof, i.e., 10 GB may be used as a reserved area. The area is used, for example, to set a new logical partition in future or to be used at logical partition transfer, which will be described later. The area may be allocated as an area for a user, the area being not to be used in the logical partition. The management is facilitated, that is, it is not required for the administrator to pay attention to the internal configuration which depends on the type of the cluster storage system. For this purpose, not the total resource quantity in each cluster 10, but the total resource quantity of the storage system 1 is represented as 100%.

FIG. 9 partly shows the physical resource allocation table stored in the terminal 5.

The part of the table 5 is created as below. The table of FIG. 3 is produced through a setting operation by use of the GUI shown in FIG. 8. The table is then processed to be delivered to other modules, which will be described later in conjunction with FIG. 10. FIG. 9 corresponds to a cluster 10 assigned with cluster number 1. Actually, the tables are created as many as there are clusters 10 in the storage system 1. The physical resource allocation table includes columns for the logical partitions 101 to 103 and rows for respective resources.

The resources are the same as those shown in FIG. 7. For each resource, the allocation thereof, i.e., a ratio of an allocated quantity is described for each logical partition. For example, for a channel assigned with channel no. 1 of the channel controller assigned with channel controller no. 1, 100% is allocated to the logical partition 1. For the bandwidth of the internal path with internal path no. 1 of the same channel controller, 50% is allocated to each of the logical partitions 1 and 3. For the channel controller with channel controller no. 1, 0% is allocated to the logical partition 2 with respect to all resources. Therefore, it is to be appreciated that the logical partition 2 is not allocated.

In summary, the maintenance processor 40 writes in its table shown in FIG. 7 the information items collected from the respective modules and then transmits the information items of the table to the management terminal 5. According to the information items, the administrator terminal 5 suggests the administrator that the administrator allocates resources using the GUI of FIG. 8. Having received items from the administrator, the administrator terminal 5 writes the items in the table shown in FIG. 3. The terminal 5 executes processing shown in FIG. 10 to create the table of FIG. 9. The sequence of processing is initiated when the administrator's software including the providing of the GUI of FIG. 8 is set up for the administrator to set the storage system.

Figure 10:
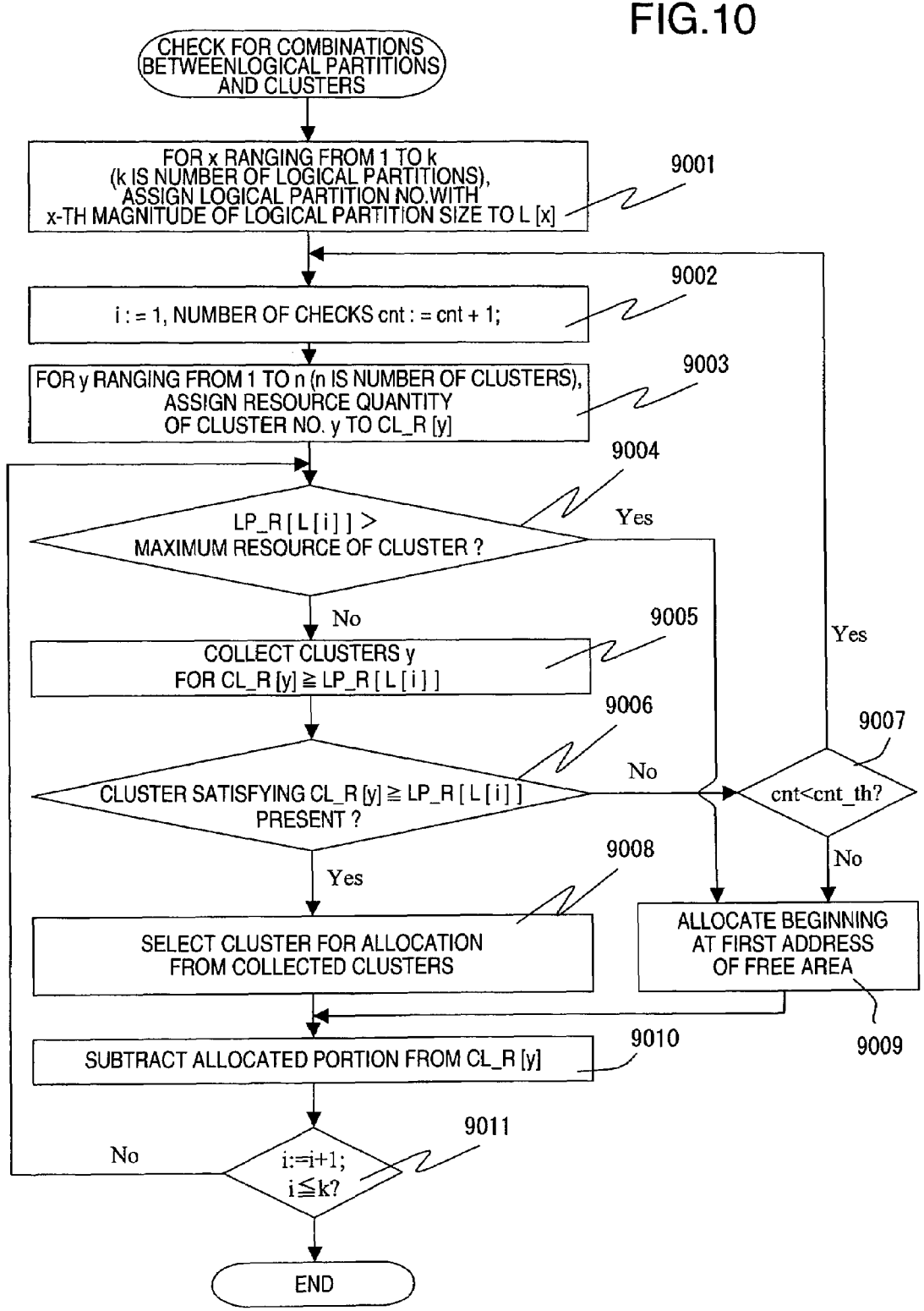
FIG. 10 is a flowchart to create a physical resource allocation table.

FIG. 10 is a flowchart of processing executed by the administrator terminal 5, after the administrator sets resource quantities to be allocated to the logical partitions, to create the physical resource allocation table shown in FIG. 9.

After the administrator finishes the setting and depresses the button 509 shown in FIG. 8, the processing is started to avoid allocation of a resource to one logical partition in which the resource is assigned to a plurality of clusters 10.

The administrator terminal 5 calculates orders of the logical partitions with respect to the quantity of a requested resource (e.g., cache memory capacity) in a descending order. Assume that k indicates the number of logical partitions and a logical partition number having an order of x is expressed as L[x]. For 1 to k, a logical partition number having an order of x is assigned to L[x] (step 9001). For example, three logical partitions (k=3) are shown in FIG. 3. In the memory capacity allocation, 25%, 40%, and 25% are allocated to the logical partition having logical partition number 1 (to be simply referred to as "logical partition 1", "logical partition 2", and "logical partition 3", respectively). The partitions are arranged in the descending resource quantity order, i.e., the logical partitions 2, 1, and 3. However, the logical partitions 1 and 3 are of the same order. In this case, the administrator terminal 5 calculates the order in consideration of a request for another resource. In FIG. 3, the ratio of the logical partition 3 is generally more than that of the logical partition 1. Therefore, the terminal 5 determines the descending order as the logical partitions 2 (L[1]=2), the logical partition 3 (L[2]=3), and the logical partition 1 (L[3]=1). When there exist logical partitions of the same order, the administrator terminal 5 may create an evaluation function for each resource to determine the order according a descending order of the total of the values of the evaluation function.

Thereafter, one is added to the count cnt (initial value is 0) indicating the number of executions of processing of steps 9003 to 9011 (to be referred to as "check" hereinbelow; step 9002).

Figure 2:
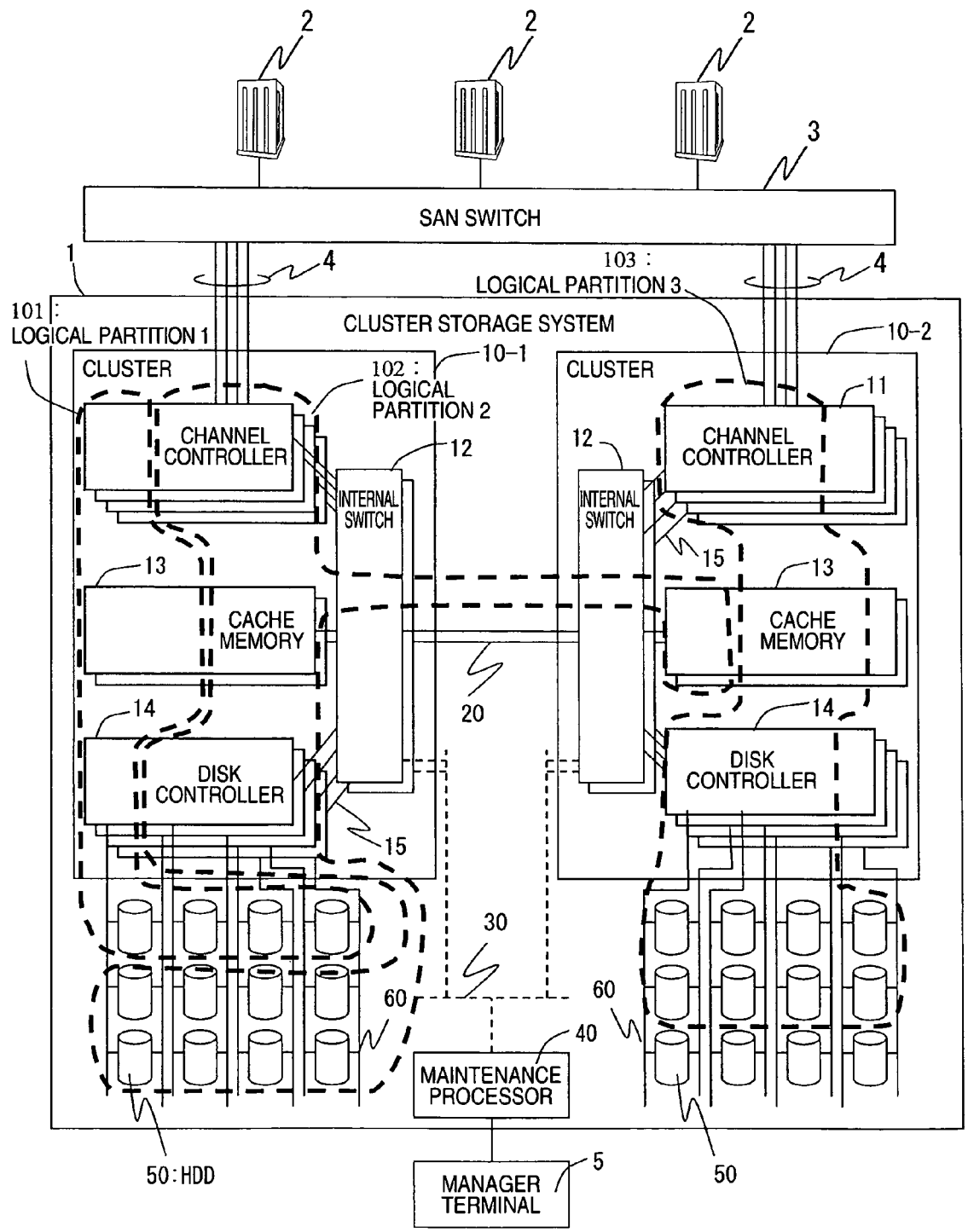
FIG. 2 is a diagram to explain a problem to be removed by the present invention.

Assume that the number of clusters is n. For y ranging from 1 to n, a resource quantity held by a cluster 10 having number y (to be referred to as "cluster 10-$y$) is assigned to CL_R[y] indicating a ratio of the resource allocatable to a logical partition for which the processing of steps 9004 to 9011 has not been executed (step 9003). For example, assume in the storage system 1 including two clusters (n=2) as shown in FIG. 2 that the cache memory capacity of the overall system is 100 GB and that of each of the clusters 10-1 and 10-2 is 50 GB. That is, each cluster possesses 50% of the total cache memory capacity. Therefore, 50 is assigned to CL_R[1] and CL_R[2].

A check is made to determine whether or not the resource quantity LP_R[L[i]] requested for logical partition L[i] (i is an integer) is more than a resource quantity of one cluster 10. If the resource quantity is more than that of one cluster 10, control goes to step 9009. Otherwise, control goes to step 9005 (step 904). For the initial loop of steps 9004 to 9011 (i=1), L[1]=2. Therefore, processing is executed for the logical partition 2.

The administrator terminal 5 collects a cluster 10 (satisfying CL_R[y]>LP_R[L[i]]) to which the resource quantity requested for the pertinent logical partition L[i] can be allocated (step 9005). If such a cluster 10 is absent, control goes to step 9007. Otherwise, control goes to step 9008 (step 9006). If there exist clusters 10 satisfying the condition, the administrator terminal 5 selects one of the clusters 10 using random number (a predetermined criterion may also be arranged; step 9008). If only one cluster 10 satisfies the condition, the random numbers are not used. The terminal 5 allocates a logical partition L[i] to the selected cluster 10 (the requested resource is allocated in the cluster 10 in an ascending order of numbers) and then subtracts the allocated resource quantity from CL_R[y] (y is the selected cluster number; step 9010). For example, according to the operation described above, the clusters 10-1 and 10-2 satisfy the condition requested for the logical partition 2 (CL_R[1]=CL_R[2]=50>LP_R[2]=40)). Assume that the cluster 10-2 is selected using, for example, a random number. The logical partition 2 is allocated to the cluster 10-2. The allocated quantity "40" is subtracted from CL_R[2] to obtain CL_R[2]=10.

Similarly, a check is made for i=2 to k (step 9011). When the check is finished for i=k, the administrator terminal 5 terminates the processing. For example, in the above operation, the second loop (i=2) is conducted for the logical partition 3 (L[2]=3). In this case, only the cluster 10-1 satisfies the condition. For the cluster 2, CL_R[2]=10<LP_R[3]=25, and hence the condition is not satisfied. For the cluster 10-1, CL_R[1]=50>LP_R[3]=25, and hence the condition is satisfied. Therefore, the cluster 10-1 is selected and the logical partition 3 is allocated thereto. The terminal 5 conducts the subtraction of CL_R[1] as CL_R[1]=50−25=25. The third loop (i=3) is carried out for the logical partition 1 (L[3]=1). The processing and the check are similarly conducted for LP_R[1]. The cluster 10-1 satisfies the condition (CL_R[1]= 25≧LP_R[1]=25, CL_R[2]=10>LP_R[1]=25). The cluster 10-1 is allocated also to the logical partition 1. As above, the logical partitions 1 and 3 are allocated to the cluster 10-1 and the logical partition 2 is allocated to the cluster 10-2.

In step 9006, if the administrator terminal 5 cannot detect a cluster 10 satisfying the condition, the check is again conducted. The terminal 5 determines whether or not cnt is less than an upper-limit value cnt_th indicating an upper-limit value for the iteration of the check. If cnt is equal to or more than cnt_th, it is assumed that the condition cannot be satisfied by any allocation, and then processing goes to step 9009 (step 9007).

As above, the combination of a logical partition and a cluster satisfying the condition is selected using random numbers. Therefore, there possibly exists a chance during the repetition of the processing for i=1, 2, etc. in which such a combination satisfying the condition cannot be detected. On the other hand, during the repetition, a combination satisfying the condition can be detected depending on cases. However, for example, when it is desired that the cache memory capacity is designated as 50 for each of the clusters 10-1 and 10-2 and 40, 30, 30 respectively for the logical partitions 1, 2, 3, a combination of a cluster and a logical partition satisfying the condition cannot be detected even if the processing is repeatedly executed. If the check is forcibly conducted to detect such a combination, an infinite loop takes place. Therefore, the upper-limit value is disposed for the iteration of the check to assume that the condition cannot be satisfied by any combination of a cluster and a logical partition. The value of cnt_th is about 10 or 1000, which requires at most several seconds for the repetition of the processing.

Depending on a series of random numbers, the condition is satisfied for all logical partitions in some cases. Therefore, the check is conducted again in a situation described below. Assume, for example, a case in which the resource is designated as 50 for each of the cluster 10-1 and 10-2 and five logical partitions are arranged as LP_R[1]=30, LP_R[2]=20, LP_R[3]=20, LP_R[4]=15, LP_R[5]=15. In this case, there exists an optimal solution in which the logical partitions 1 and 2 are allocated to the cluster 10-1 and the logical partitions 3 to 5 are allocated to the cluster 10-2. However, when the logical partitions 1 and 4 are allocated to the cluster 10-1 and the logical partitions 2 and 3 are allocated to the cluster 10-2 by using random numbers, the logical partition 5 is related to two clusters. In this situation, by conducting the check again, it is possible to obtain the optimal solution.

When it is determined in step 9004 that the resource requested for a logical partition has a resource capacity more than the resource capacity of the cluster 10 or when it is determined in step 9007 that there exists no allocation satisfying the condition, the resource is sequentially allocated to a free area associated with a smaller cluster number to thereby execute the processing of step 9010 and subsequent steps (step 9009). That is, in step 9009, it is processing to be executed when a logical partition relates to two clusters. Also in this situation, the allocation is conducted in step 9001 beginning from a logical partition having a larger size so that each of the other logical partitions is within one cluster.

In the description of the specific example, the operation is conducted paying attention to the cache memory capacity. However, resources of hierarchies below the cluster such as channels in the channel controller and processors in the disk controller are also taken into consideration as below. In step 9001, the system calculates orders of logical partitions with respect to size thereof. In steps 9004 and 9006, a check is made to determine whether or not the condition requested for the logical partition is satisfied for all types of resources. For example, when the request indicates allocation of a logical partition to a channel, an internal path, and a cache memory, the system first executes processing for the channel, the internal path, and the cache memory and then transfers control to the subsequent loop. The processing may be executed for the resources in a random way or in a sequence according to predetermined reference values.

As a result of a series of processing, the resources are allocated to the logical partitions to thereby produce the physical resource allocation table shown in FIG. 9. The administrator terminal 5 sends the result of resource allocation to the maintenance processor 40. According to the result, the processor 40 updates the logical partition information 1122, the mail box 1131, and the logical partition information master 1321 of each module and notifies the processors 111 to execute processing in the new system configuration.

FIG. 1 shows logical partitions to which resources are allocated according to the present invention. This differs from FIG. 2 in that one logical partition is allocated to one cluster 10. As a result, it is possible to suppress use of an inter-cluster path 20 not having a sufficient bandwidth to prevent performance deterioration due to a limited bandwidth of the inter-cluster path 20.

The combination satisfying the condition may be detected in a random way as described above. Or, the optimization problem may be solved using a genetic algorithm, a neural network, or the like. However, an algorithm to solve an optimization problem generally requires a large memory capacity, and an algorithm using a statistic method requires calculation of real numbers and adjustment of parameters. Therefore, the algorithm described above leads to an advantageous effect that the large memory capacity, the calculation of real numbers, and the like are not required.

Figure 11:
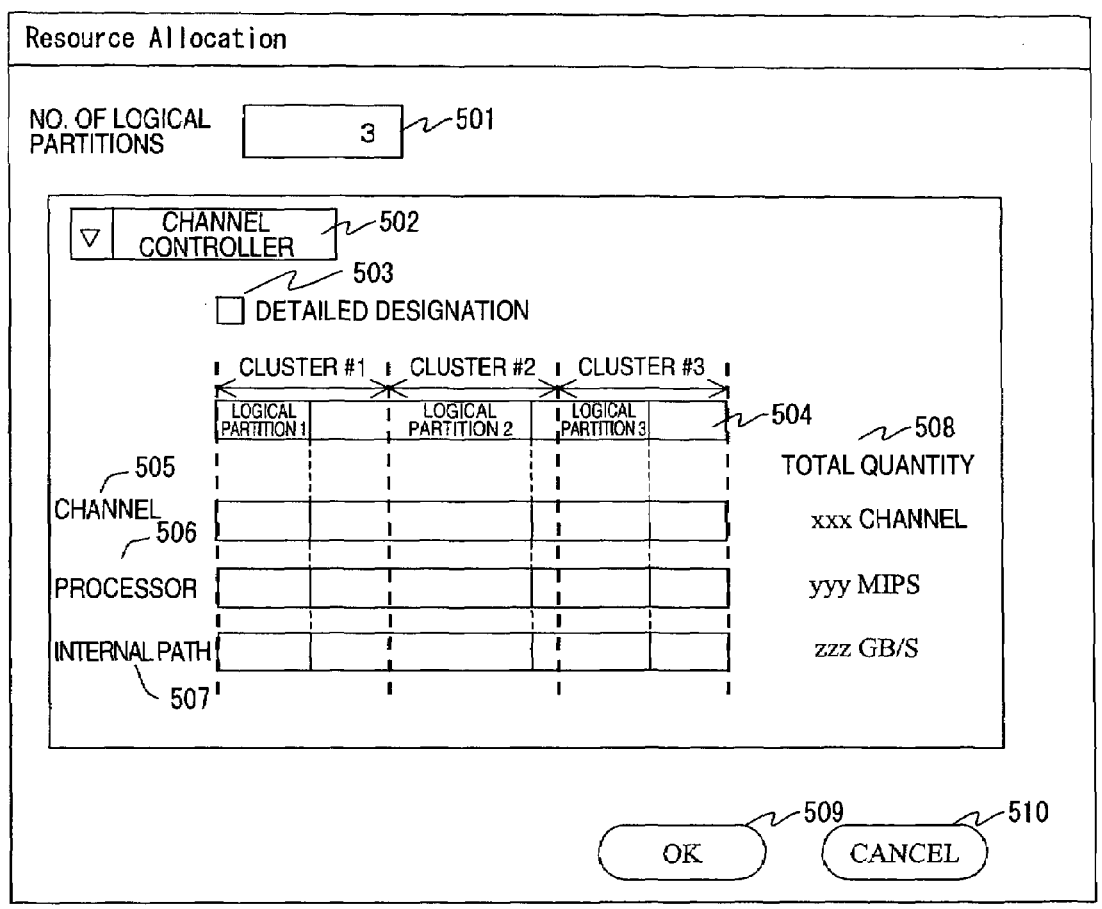
FIG. 11 is a diagram showing an example of a GUI other than that shown in FIG. 8.

FIG. 11 shows an example of a GUI the administrator terminal 5 provides to the administrator to allocate resources to respective logical partitions. This differs from FIG. 8 in that the total values of the resource quantities of the respective clusters 10 are calculated to be presented to the administrator. Using the displayed items, the administrator determines clusters to which logical partitions are allocated. In this operation, it is assumed that the administrator has knowledge about the cluster configuration, and hence the processing of FIG. 10 to obtain a solution for the combination is not required.

Through the processing described above, the logical partitions can be allocated as shown in FIG. 1. Description will next be given of a cluster storage system 1 which increases availability thereof when the logical partitions are allocated as above and a method of controlling the storage system 1. First, description will be given of availability of a cluster 10 for explaining the method of control.

Figure 12:
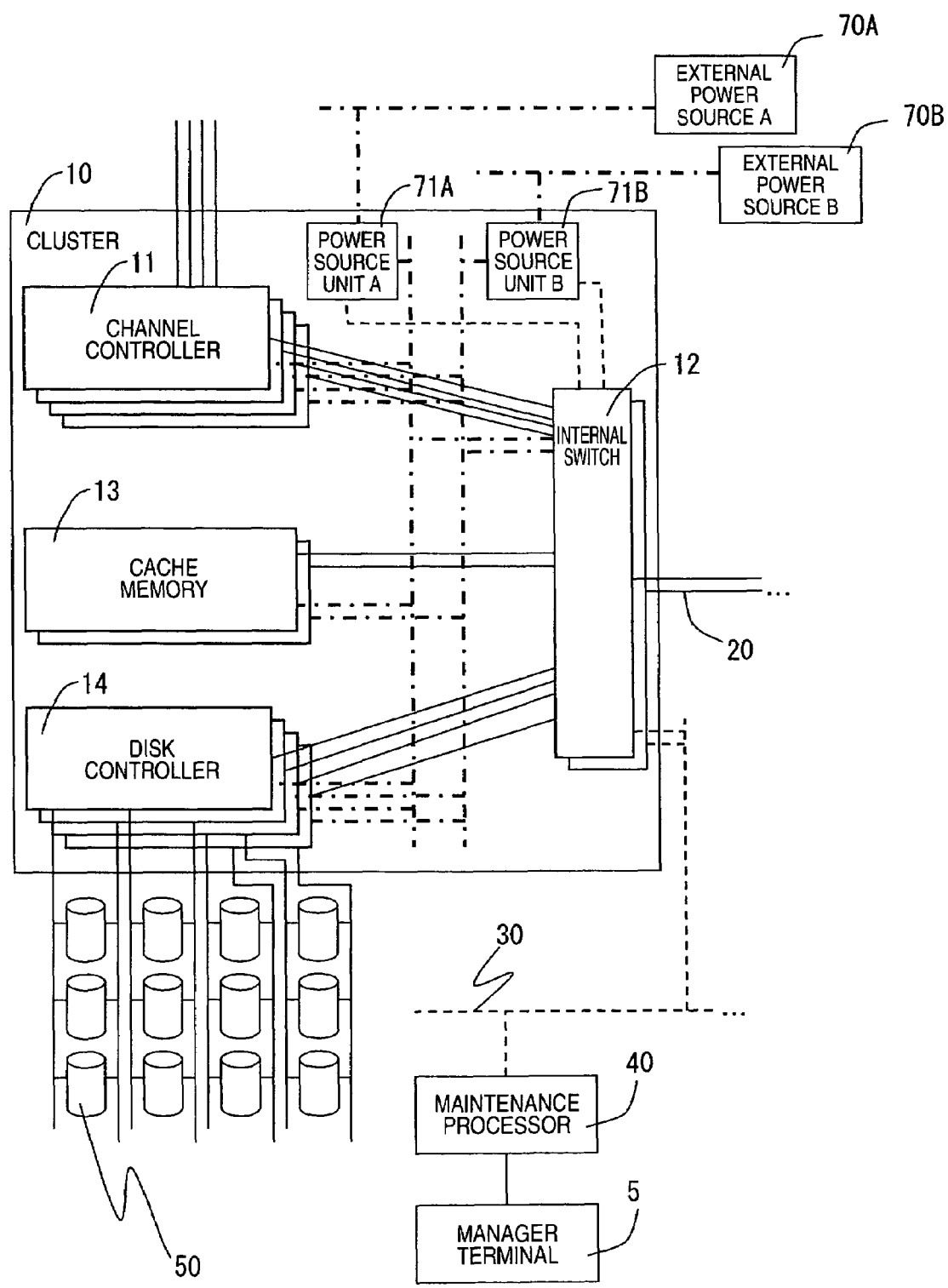
FIG. 12 is a diagram showing an inner configuration of a cluster 10.

FIG. 12 shows an inner configuration of the cluster 10. The constituent components of the storage system 1 are redundantly configured, and the power source system is also duplicated. External power sources 70A and 70B of two power supply systems using the commercial power supply or the like supply power to power source units 71A and 71B, respectively. Each of the units 71A and 71B converts power from the external power source into a voltage suitable for operation of modules in the cluster 10 and applies the voltage to the modules. In the power supply system, the power source 71A powers a first half of the modules of the cluster 10 and the power source 71B powers a second half of the modules thereof. Consequently, even if the power source 71A or 71B fails, one half of the modules can be powered by the remaining normal power source 71B and can continue operation. The HDD 50 is supported using a duplicated power supply system dedicated thereto. The power source units 71A and 71B can communicate information such as states of associated components via the management network 30 with the maintenance processor 40.

The internal components of the cluster 10 are also redundantly constructed, and hence the cluster 10 has high availability. However, when a module fails and its redundancy is lost, system failure takes place if the associated module fails. To overcome this difficulty, there can be considered an embodiment in which when the redundancy is lost due to failure of a module, control is transferred to another cluster holding the redundancy. Description will now be given of the embodiment.

Figure 13:
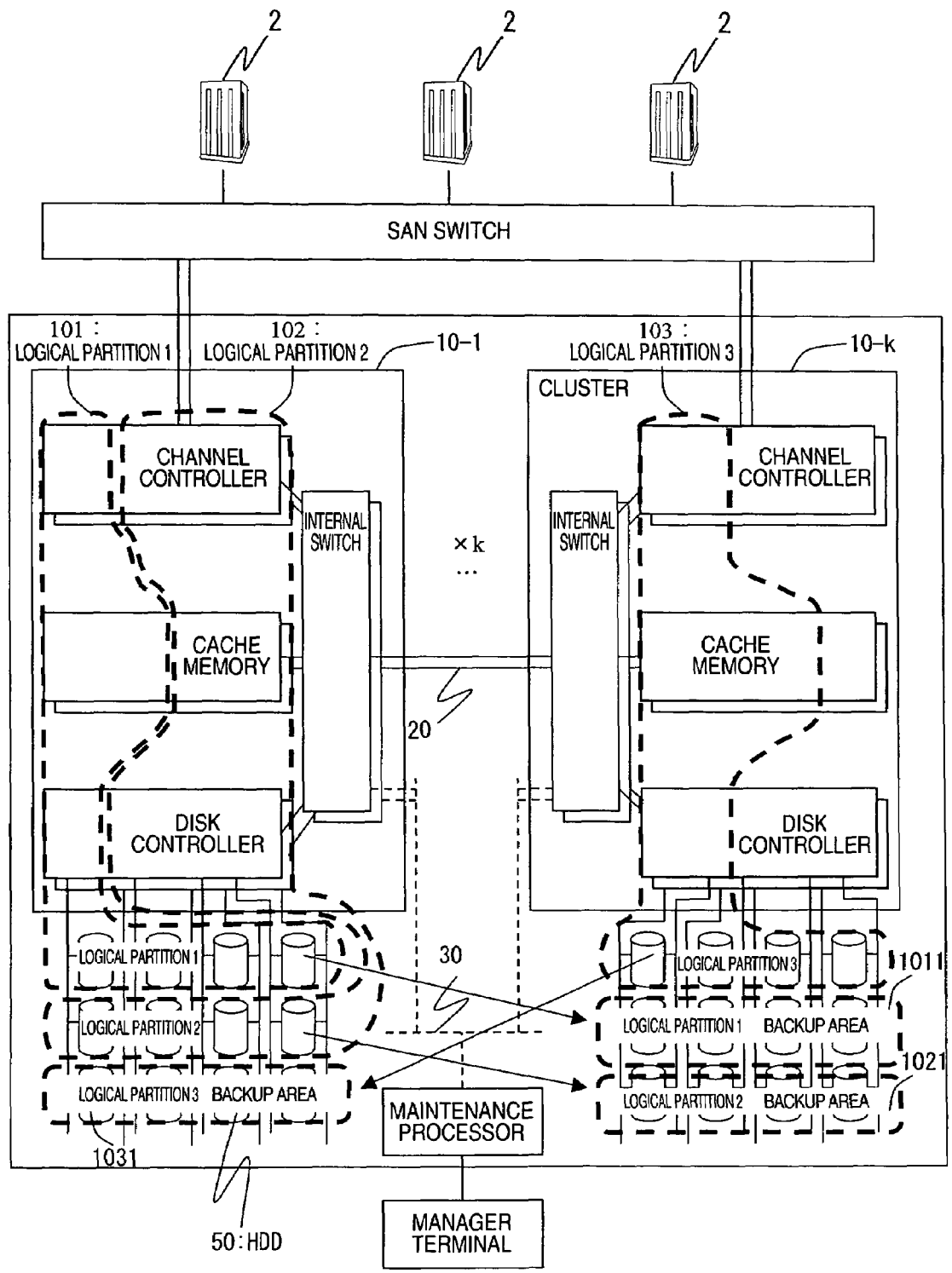
FIG. 13 is a diagram showing an example of logical partitions in a configuration in which control is transferred, at occurrence of failure in a cluster 10, to another cluster 10 in a normal state.

FIG. 13 shows an example of logical partitions in a configuration in which at occurrence of failure in a cluster 10, control is transferred to another cluster 10 in a normal state. Particularly, to transfer control between the clusters 10, backup areas 1011, 1021, and 1031 are arranged in the HDD 50 for the respective logical partitions.

In the configuration, when a cluster 10 is closed, it is not possible to access the HDD 50 controlled by the closed cluster 10. Therefore, before control is transferred to a normal cluster 10, data in the HDD 50 of the closed cluster 10 is copied onto an HDD 50 controlled by the normal cluster 10 so that copy data is accessed as before. For this purpose, it is required to beforehand secure the backup areas 1011, 1021, and 1031 as copy destination areas. As shown in FIG. 13, the backup area is secured in a cluster 10 other than the cluster to which the logical partition of the backup source is allocated. For example, for the logical partition 3 (103) allocated to the cluster 10 of number 2, a backup area 1031 is arranged in the cluster 10 of number 1.

Figure 14:
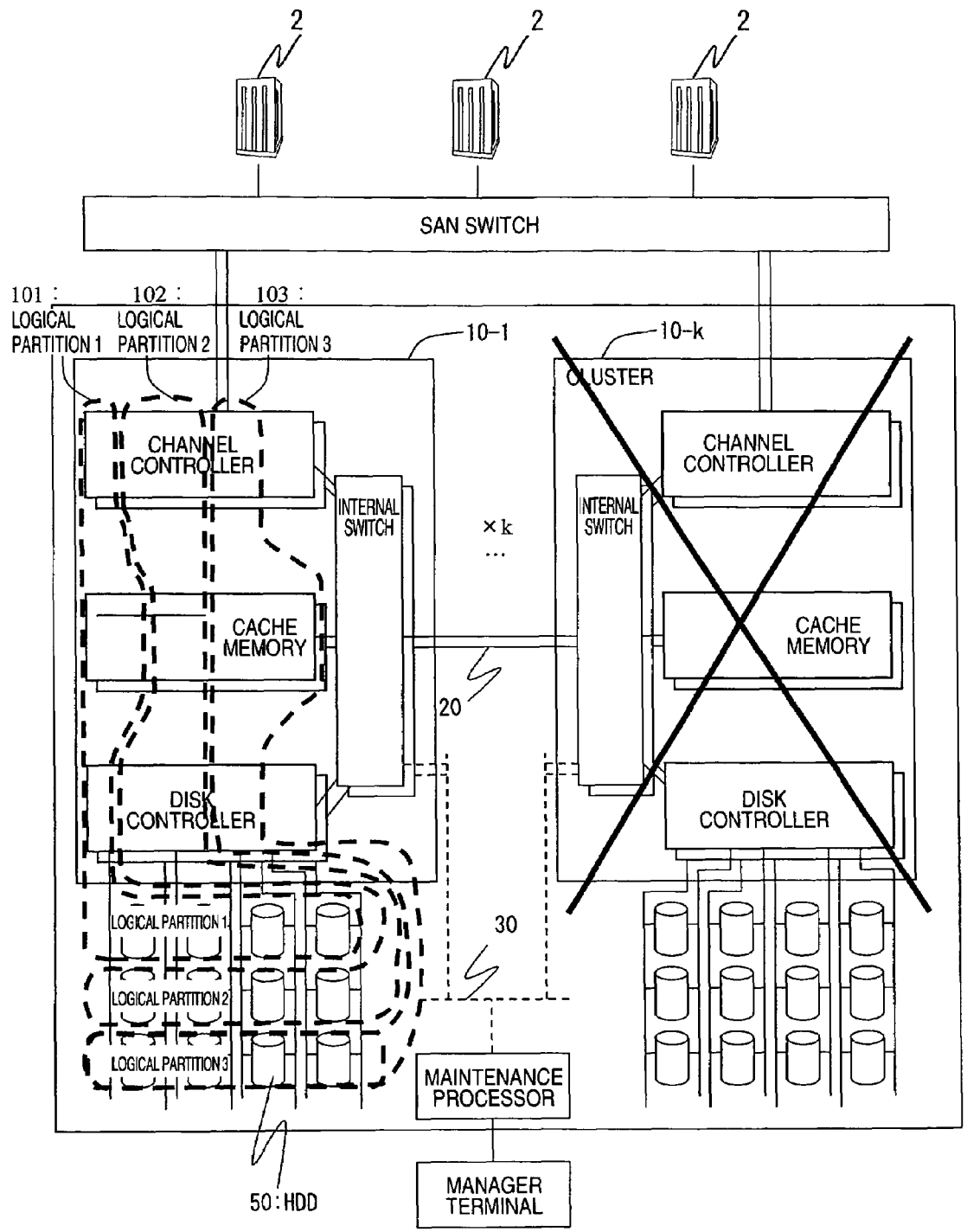
FIG. 14 is a diagram showing an example of logical partitions in a configuration in which control has been transferred to a normal cluster at cluster failure.

FIG. 14 shows an example of logical partitions in a configuration in which processing of the logical partition 3 has been transferred due to failure in the cluster 10-k in the state of FIG. 13 to a normal cluster 10-1.

The volumes of the logical partition 3 are moved to the backup area 1031 of FIG. 13. The resources allocated to the logical partitions 1 (101) and 2 (102) are allocated to the logical partition 3 (103). This guarantees continuous operation for all logical partitions in the storage system 1.

Figures 15, 16:
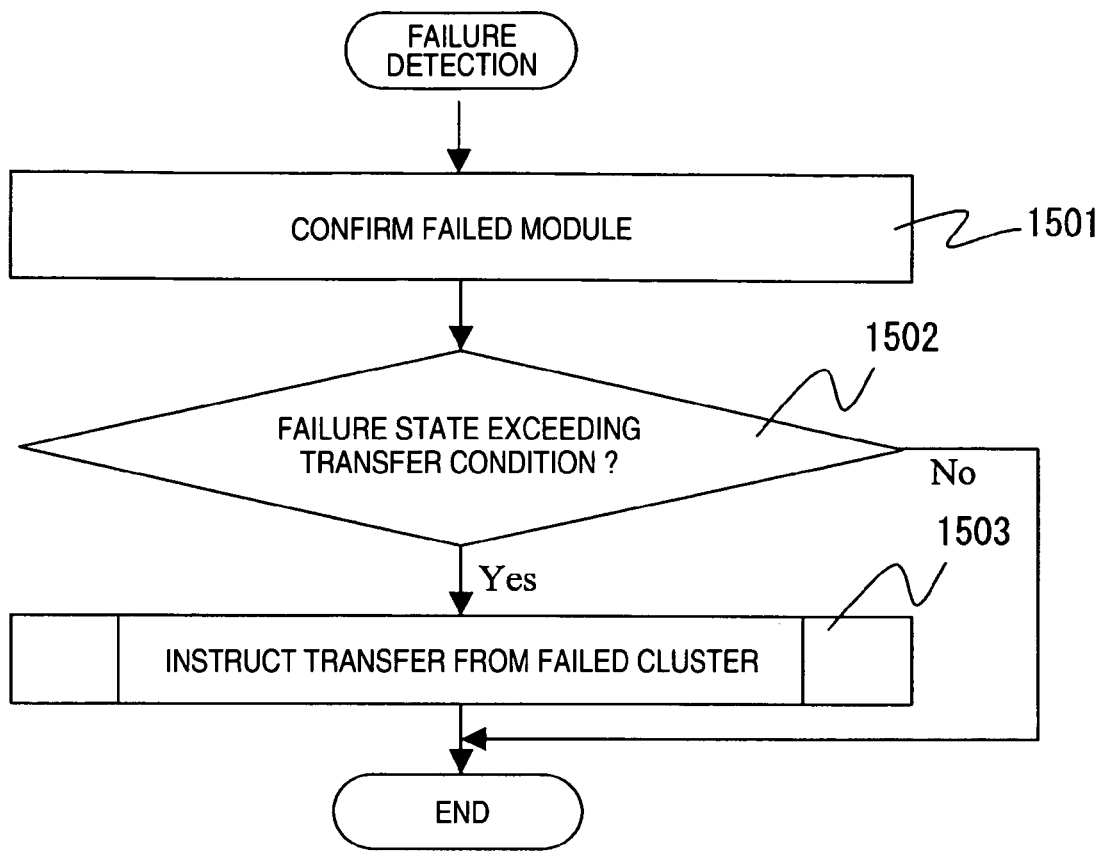
FIG. 15 is a flowchart showing operation conducted when failure is detected.
FIG. 16 is a diagram showing a transfer event table.

FIG. 15 is a flowchart showing operation at detection of failure. The administrator terminal 5 executes the processing in this case.

When failure occurs in a module, the maintenance processor 40 detects occurrence of the failure, identifies the failed module, and investigates magnitude of the failure. The maintenance processor 40 then notifies the failure to the administrator terminal 5. The terminal 5 identifies the failed module and confirms the magnitude of the failure (step 1501). The terminal 5 compares the magnitude with that shown in a transfer condition column 1602 of a failed module 1601 in a transfer event table 1600 shown in FIG. 16. A check is made to determine whether or not the magnitude exceeds that determined in the table 1600 (step 1502). If the magnitude is less than that of the table 1600, the administrator terminal 5 terminates the processing. If the magnitude is equal to or more than that of the table 1600, the terminal 5 sends an instruction via the maintenance processor 40 to transfer control from the failed cluster 10-k to the cluster 10-1 (step 1503).

FIG. 16 shows an example of the transfer event table 1600. The administrator terminal 5 keeps the table 1600 and the administrator updates the contents thereof according to the policy for the redundancy.

The table 1600 includes entries each of which includes a failed module field 1601 and a transfer condition field 1602. At occurrence of failure, a module of the failure and magnitude of the failure are determined. If the magnitude is equal to or more than that indicated by the transfer event field 1602 associated with the failed module, a cluster associated with the failure is closed and then operation is initiated to transfer the pertinent processing to a normal cluster. For example, at occurrence of failure in a power source, the transfer operation is started when it is determined that one module fails. When failure occurs in a channel controller 11, since the transfer event field 1602 contains "unchanged", the system does not conduct the transfer operation.

For the transfer event, it is also possible to register a threshold value within one module. For example, the transfer operation is conducted when failure occurs in a predetermined number of processors in a channel controller 11. The same transfer event table 1600 may be used for the clusters 10 or a transfer event table 1600 may be disposed for each cluster 10. The latter case is effective when the configuration, e.g., the number of modules varies between the clusters 10.

Figure 17:
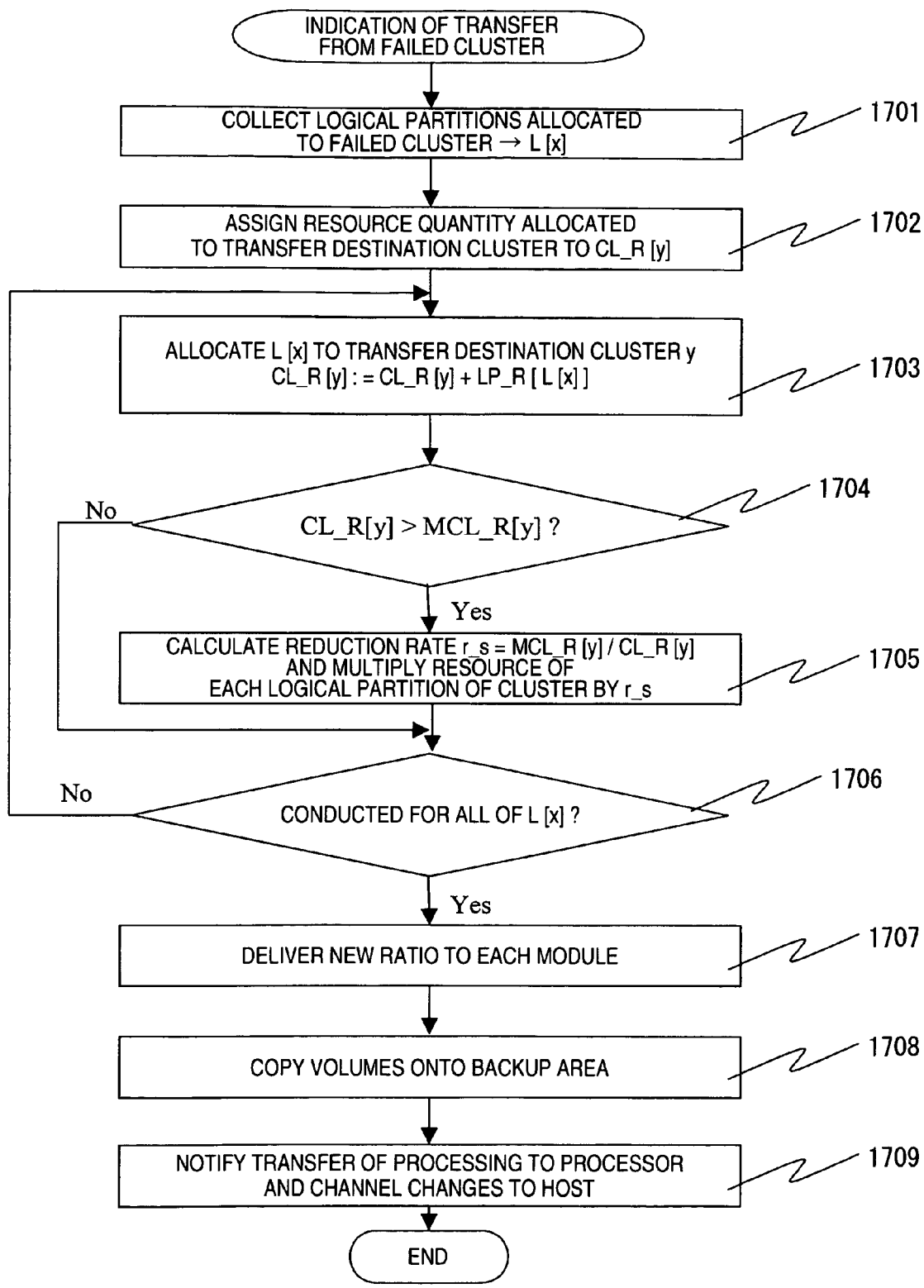
FIG. 17 is a flowchart showing operation of a administrator terminal 5 to determine logical partition allocation after transfer of control.

FIG. 17 is a flowchart showing operation in which the administrator terminal 5 determines, before issuing an indication of transfer of processing from a failed cluster 10 to a normal cluster 10, allocation of logical partitions to be effective after the transfer operation.

First, logical partitions L[x] allocated to the failed cluster 10 are collected in a list (step 1701). Assume that u partitions are collected. Then, a resource quantity allocated to a transfer destination cluster 10-y is assigned to a variable CL_R[y] (step 1702). Processing of steps 1703 to 1706 is sequentially executed beginning at x=1. L[x] is allocated to the cluster y of the transfer destination of the logical partition L[x]. Specifically, a resource quantity LP_R[L[x]] allocated to the logical partition L[x] is added to CL_R[y] (step 1703). A check is made to determine whether or not CL_R[y] exceeds a resource quantity MCL_R[y] possessed by the cluster 10-y (step 1704). MCL_R[y] is a constant determined by y. Assume an example in which the cluster 10-1 fails and control transfers to the cluster 10-2 in FIG. 1. As described above, since the logical partitions 1 and 3 are allocated to the cluster 10-1 and the logical partition 2 is allocated to the cluster 10-2, the logical partition 1 (=L[3]) and the logical partition 3 (=L[2]) are collected. For the cache memory capacity, CL_R[2]=50 (original resource quantity)+25 (resource quantity of logical partition 1)+25 (resource quantity of logical partition 3)=100. The resource quantity MCL_R[2] of the cluster 10-2 is 50. If CL_R[y] is more than MCL_R[y], the allocation cannot be conducted without changing the resource quantity. Therefore, in order to allocate the resource to each logical partition allocated to the transfer destination cluster 10-y, the ratio of the resource requested for the logical partition is reduced. The reduction ratio r_s is calculated as MCL_R[y]/CL_R[y]. The ratio r_s is multiplied by the resource requested for each logical partition allocated to the cluster 10 (step 1705). In the example, r_s=50/100=0.5. That is, the resource quantities requested for the logical partitions 1 to 3 allocated to the cluster 10-2 are multiplied by 0.5.

Similarly, for x=2 to u, processing of steps 1703 to 1705 is executed (step 1706). When the check is finished for x=u, the processing is terminated. When the check is completely made for all items, results of the processing are delivered via the maintenance processor 40 to each module (step 1707). To transfer data, an instruction is issued to copy volumes onto the backup area (step 1708). After the processing is finished, the transfer is notified to the processor 111 of the transfer destination cluster 10. According to necessity, a message indicating changes of channels is notified to the host (step 1709). In this way, it is possible to improve availability of the cluster storage system 1.

In the above description, areas beforehand allocated are also re-allocated to secure resources after the transfer operation. However, for the HDD 50, it is a common practice to assign spares in advance. Therefore, ordinarily, even when the resources are reduced as above, data can be transferred between the HDDs 50. It is also possible to arrange a cluster 10 not to be allocated such that the cluster 10 is assigned as a spare cluster for the transfer. As a result, the system operation can be continuously carried out without reducing the allocated resources. Therefore, also at occurrence of failure in a cluster 10, the system performance can be kept unchanged.

Second Embodiment

In conjunction with the first embodiment, description has been given of an example in which the backup areas are assigned in the HDD 50. However, by use of a configuration of the cluster storage system 1, it is not required to secure the backup areas.

Figure 18:
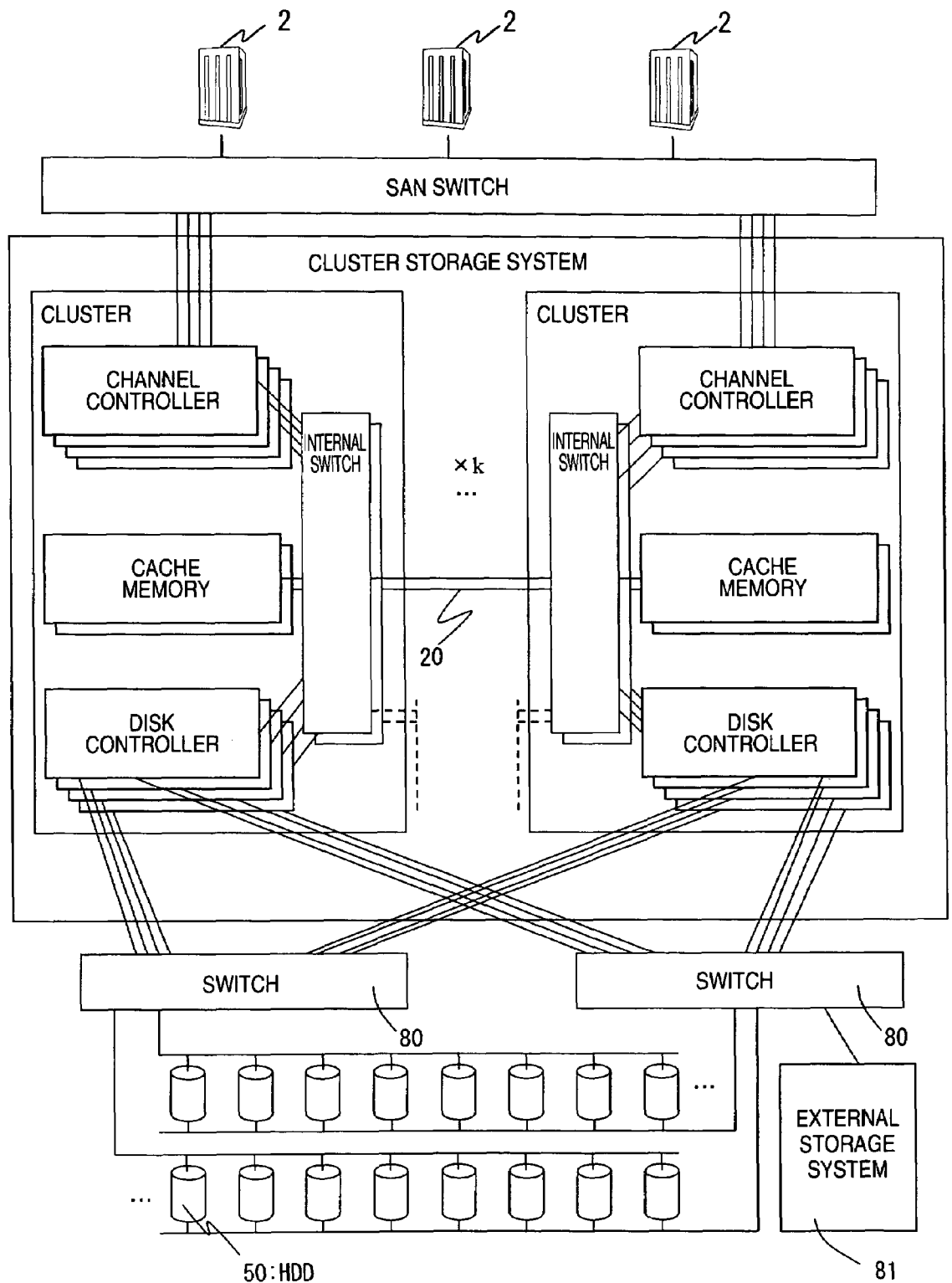
FIG. 18 is a configuration diagram of a second embodiment of a computer system.

FIG. 18 shows a configuration of a second embodiment of a computer system. The system differs from that shown in FIG. 4 in that the disk controllers 14 are connected respectively via switches 80 (an SAN switch is also available) to the HDD 50. This configuration prevents the cluster 10 from restricting an access to a particular HDD 50. In this case, the switch 80 may be connected to an external storage system 81 (a cluster storage system is also available) as a data record destination. The cluster does not include the HDD 50 in the second embodiment. This is because the HDD 50 is connected via the switches 80 to the respective disk controllers independently of the cluster.

Figure 19:
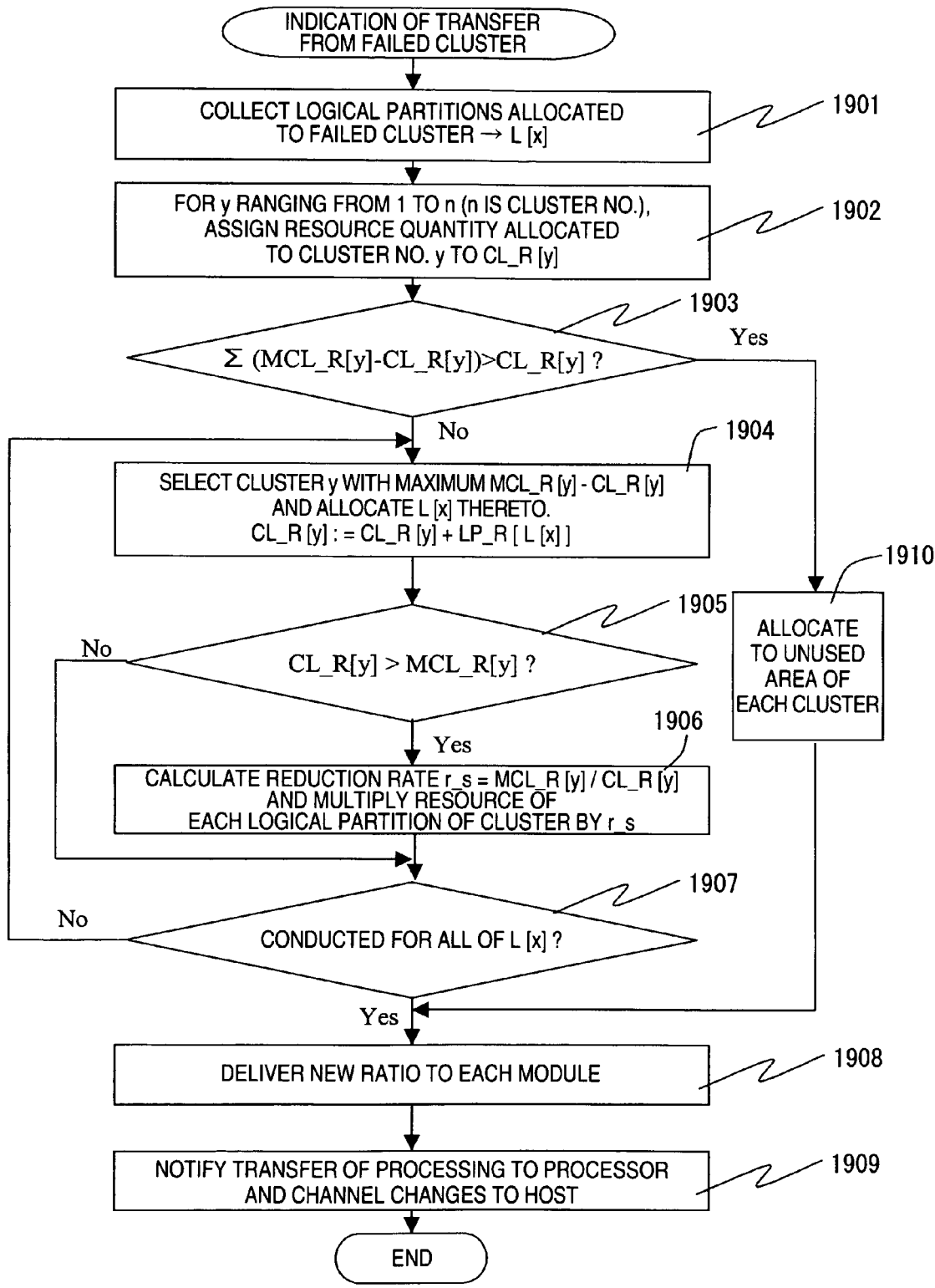
FIG. 19 is a flowchart showing operation of the administrator terminal 5 to allocate logical partitions in the second embodiment.

FIG. 19 is a flowchart of processing in which the administrator terminal 5 determines, at issuance of an instruction of a transfer of processing from a failed cluster 10 to a normal cluster, allocation of logical partitions to be used after the transfer in the configuration shown in FIG. 18. This differs from the processing shown in FIG. 17 in that the backup areas are not required to be assigned in advance. That is, the backup areas are determined when the processing is transferred to the transfer destination cluster 10.

First, logical partitions L[x] allocated to the failed cluster 10 are collected in a list (step 1901). Assume that the number of collected logical partitions is u. Thereafter, a resource quantity allocated to each cluster is assigned to a variable CL_R[y] ($1 \leq y \leq n$; step 1902). A check is made to determine whether or not the total of free areas of each cluster is more than the resource quantity allocated to the cluster (step 1903). If the free resource quantity is more than the resource quantity, the transfer can be conducted without affecting the other logical partition. Therefore, the free resources of each cluster are allocated to the logical partition of the failed cluster (step 1910). Otherwise, processing of steps 1904 to 1907 is sequentially executed beginning at x=1. A cluster 10-$y$ with a largest free resource is selected as a transfer destination of the logical partition L[x] to allocate L[x] thereto. Specifically, the resource quantity LP_R[L[x]] allocated to the logical partition L[x] is added to CL_R[y] (step 1904). Thereafter, whether or not CL_R[y] is more than the resource quantity MCL_R[y] possessed by the cluster 10-$y$ is determined (step 1905). If this is the case, the ratio of the resource requested for the logical partition is reduced so that the resource is allocated to each logical partition allocated to the transfer destination cluster 10-$x$. The reduction ratio r_s is calculated as MCL_R[y]/CL_R[y]. The resource requested for each logical partition allocated to the cluster 10 is multiplied by the reduction ratio r_s (step 1906).

Similarly, for x=2 to u, processing of steps 1904 to 1907 is executed (step 1907). When the check is finished for x=u, the processing is terminated. When the check is completely made for all items, results of the processing is delivered via the maintenance processor 40 to each module (step 1908). After the processing is finished, the transfer is notified to the processor 111 of the transfer destination cluster 10. According to necessity, a message of channel changes is notified to the host (step 1909). In this way, it is possible to improve availability of the cluster storage system 1.

It is also possible to cope with sudden failure of an entire cluster 10. That is, a backup area is disposed also for the cache memory 13. Also in the regular operation, data is duplicated for the cluster 10 having the backup area. In the duplication, if the input/output request from the host is a read request, the processing can be executed within the cluster 10. Only if the request is a write request, an access is made via the inter-cluster path 20 to a plurality of clusters 10. This consequently minimizes deterioration of performance due to the use of the inter-cluster path 20.

FIG. 20 shows, in a flowchart, operation to be conducted when an input/output request of "write" is received from a host in such a situation. The processor 111 of the channel controller 11 makes a check to determine whether or not data at an address indicated by the input/output request is present in the cache memory 13. If the data is present, processing of step 2004 is executed. Otherwise, an area is secured for the write data to be recorded in the cache memory 13 of the cluster 10 to which the channel controller 11 belongs (step 2002). Additionally, an area to record the write data is also secured in the cache memory 13 of the cluster 10 having the backup area (step 2003). After the areas are secured, the write data is written in the respective cache memories 13 (step 2004). When the write operation is finished, a report of completion of the input/output operation is sent to the host (step 2005). This embodiment differs from the other embodiments in that the write data is written also in the cache memory 13 of another cluster 10 in steps 2003 and 2004.

In the description, to discriminate a cluster from a storage system, a term of "cluster storage system" is used. However, in general, a system including a plurality of clusters is also called a storage system depending on cases. Moreover, an operation to allocate a logical partition which relates to two clusters has been described as an operation causing a bottleneck. However, the present invention can be efficiently applied to any architecture including another bottleneck.

According to the present invention, it is guaranteed to establish logical partitions with performance corresponding to resources allocated thereto.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system comprising:
   a first disk device;
   a first control device coupled with the first disk device for controlling the first disk device so as to store data, the first control device including at least a first cache memory;
   a second disk device
   a second control device coupled with the second disk device for controlling the second disk device so as to store data, the second control device including at least a second cache memory; and
   a manager device coupled with both the first control device and the second control device through a path;
   wherein:
   the manager device is configured to receive a first request for determining a first capacity to be assigned to a first logical partition, and to receive a second request for determining a second capacity to be assigned to a second logical partition;
   the amount of the first capacity is arranged to be smaller than the capacity of the first cache memory;
   the manager device is configured to perform processing in order to assign the first capacity in accordance with an amount of the first cache memory to the first logical partition;
   the manager device is configured to store an amount of capacity as a remaining capacity capable of being assigned to the second logical partition after completion of assignment of the first capacity to the first logical partition;
   the manager device is configured to perform processing in order to assign the second capacity in accordance with an amount of the second cache memory to the second logical partition, the second capacity determined in response to the second request, if the amount of capacity determined in response to the second request is larger than the remaining capacity and is smaller than the amount of capacity of the second cache memory; and
   the manager device is configured to perform processing in order to assign the amount of capacity determined in response to the second request in accordance with amounts of both the first and second cache memories for the second logical partition if the amount of capacity determined in response to the second request is larger than the remaining capacity, larger than the amount of capacity of the second cache memory, and smaller than the sum of the remaining capacity and the amount of capacity of the second cache memory.

2. A system according to claim 1, wherein the first control device and second control device are physically independent of each other.

3. A system according to claim 1, further comprising an administrator unit including a display screen for displaying information on the storage system.

4. The system according to claim 3, wherein the administrator unit accepts inputs of number of logical partitions through the screen.

5. The system according to claim 1, wherein the first cache memory and the second cache memory provided within each of the first control device and the second control device are used for respectively storing data read or written from or to each of the first and the second disk devices, wherein each of the first cache memory and the second cache memory is considered a resources of the storage system.

6. The system according to claim 1, wherein each of the first cache memory and the second cache memory includes both a data area for storing data having, been stored in the first and second disk devices and a control data area for storing information used for control of the storage system.

7. The system according to claim 1, further comprising a maintenance processor coupled with both the first control device and the second control device through a management network and adapted to store information on each resources respectively allocated to either of the first control device and the second control device.

8. The system according to claim 7, wherein the maintenance processor is adapted to collect information on physical resources of the resources and adapted to prepare a table hierarchically showing the information having been collected in a table manner.

9. The system according to claim 1, further comprising a-first channel controller and a second channel controller, wherein each of the first channel controller and the second channel controller includes a processor for preparing a plurality of logical partitions in accordance with both a control program and a logical partition information, the control program and the logical partition information being arranged to be stored in a memory provided within the channel controller.

* * * * *